US012764320B2

(12) United States Patent
Lee

(10) Patent No.: US 12,764,320 B2
(45) Date of Patent: Oct. 13, 2026

(54) METHOD AND DEVICE FOR PERFORMING MOTION COMPENSATION USING MERGE CANDIDATE LIST

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 19/021,085

(22) Filed: Jan. 14, 2025

(65) Prior Publication Data

US 2025/0159230 A1 May 15, 2025

Related U.S. Application Data

(60) Continuation of application No. 18/117,625, filed on Mar. 6, 2023, now Pat. No. 12,231,672, which is a (Continued)

(30) Foreign Application Priority Data

Oct. 20, 2017 (KR) ........................ 10-2017-0136512

(51) Int. Cl.
*H04N 19/51* (2014.01)
*H04N 19/115* (2014.01)
*H04N 19/176* (2014.01)

(52) U.S. Cl.
CPC ........... *H04N 19/51* (2014.11); *H04N 19/115* (2014.11); *H04N 19/176* (2014.11)

(58) Field of Classification Search
CPC .... H04N 19/174; H04N 19/43; H04N 19/436; H04N 19/463; H04N 19/51; H04N 19/52;
(Continued)

(56) References Cited

U.S. PATENT DOCUMENTS 9,154,790 B2 10/2015 Yie et al.
9,549,200 B1 1/2017 Zhou et al.
(Continued)

FOREIGN PATENT DOCUMENTS

CN 103139564 A 6/2013
CN 103535039 A 1/2014
(Continued)

OTHER PUBLICATIONS

Hui Yong Kim et al., "AHG10: Unified design on parallel merge/skip with reduced candidates", Document: JCTVC-H0247, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, pp. 1-7.
(Continued)

*Primary Examiner* — Nathnael Aynalem
(74) *Attorney, Agent, or Firm* — IP Legal Services, LLC

(57) ABSTRACT

Provided are a method and device for decoding image using merge candidate list. The method may include: deriving a spatial merge candidate of a current block; generating a merge candidate list for the current block on the basis of the spatial merge candidate; acquiring motion information on the current block on the basis of the merge candidate list; and performing motion compensation for the current block by using the motion information.

4 Claims, 14 Drawing Sheets

100

Related U.S. Application Data continuation of application No. 17/246,525, filed on Apr. 30, 2021, now Pat. No. 11,627,330, which is a division of application No. 16/622,434, filed as application No. PCT/KR2018/012393 on Oct. 19, 2018, now Pat. No. 11,025,943.

(58) Field of Classification Search

CPC ...... H04N 19/56; H04N 19/50; H04N 19/503; H04N 19/507; H04N 19/513; H04N 19/517; H04N 19/521; H04N 19/523; H04N 19/527; H04N 19/53; H04N 19/533; H04N 19/537; H04N 19/54; H04N 19/543; H04N 19/17; H04N 19/172; H04N 19/176; H04N 19/177

USPC ........................................ 375/240.01–240.29

See application file for complete search history.

(56) References Cited

U.S. PATENT DOCUMENTS

| | | | | |
|---|---|---|---|---|
| 10,820,011 | B1 | 10/2020 | Takehara et al. | |
| 2012/0257678 | A1 | 10/2012 | Zhou et al. | |
| 2012/0320984 | A1 | 12/2012 | Zhou | |
| 2013/0003850 | A1 | 1/2013 | Sugio et al. | |
| 2013/0010869 | A1 | 1/2013 | Sugio et al. | |
| 2013/0022117 | A1 | 1/2013 | Lou et al. | |
| 2013/0077691 | A1 | 3/2013 | Zheng et al. | |
| 2013/0101042 | A1* | 4/2013 | Sugio | H04N 19/139 375/E7.123 |
| 2013/0107958 | A1* | 5/2013 | Shimada | H04N 19/198 375/E7.125 |
| 2013/0114720 | A1 | 5/2013 | Wang et al. | |
| 2013/0114723 | A1* | 5/2013 | Bici | H04N 19/176 375/240.16 |
| 2013/0128978 | A1* | 5/2013 | Yie | H04N 19/137 375/240.12 |
| 2013/0177083 | A1* | 7/2013 | Chen | H04N 19/70 375/240.16 |
| 2013/0188716 | A1 | 7/2013 | Seregin et al. | |
| 2013/0188720 | A1 | 7/2013 | Wang et al. | |
| 2013/0272413 | A1 | 10/2013 | Seregin et al. | |
| 2013/0308708 | A1 | 11/2013 | Sugio et al. | |
| 2014/0078254 | A1 | 3/2014 | Lin et al. | |
| 2014/0092981 | A1 | 4/2014 | Lin et al. | |
| 2014/0301461 | A1 | 10/2014 | Jeon et al. | |
| 2014/0307789 | A1* | 10/2014 | Kim | H04N 19/103 375/240.12 |
| 2014/0341284 | A1 | 11/2014 | Kim et al. | |
| 2014/0355687 | A1 | 12/2014 | Takehara et al. | |
| 2015/0085930 | A1 | 3/2015 | Zhang et al. | |
| 2015/0103897 | A1 | 4/2015 | Kim et al. | |
| 2015/0271489 | A1 | 9/2015 | Sugio et al. | |
| 2016/0191939 | A1 | 6/2016 | Lin et al. | |
| 2016/0316221 | A1* | 10/2016 | Ikai | H04N 19/52 |
| 2016/0323597 | A1 | 11/2016 | Takehara et al. | |
| 2017/0163987 | A1 | 6/2017 | Sugio et al. | |
| 2017/0214922 | A1 | 7/2017 | Jeon et al. | |
| 2017/0280159 | A1 | 9/2017 | Xu et al. | |
| 2017/0332099 | A1 | 11/2017 | Lee et al. | |
| 2018/0063533 | A1 | 3/2018 | Sugio et al. | |
| 2018/0115764 | A1 | 4/2018 | Lin et al. | |
| 2018/0131954 | A1 | 5/2018 | Zhou | |
| 2018/0242024 | A1 | 8/2018 | Chen et al. | |
| 2018/0295366 | A1 | 10/2018 | Sugio et al. | |
| 2018/0324454 | A1 | 11/2018 | Lin et al. | |
| 2019/0068978 | A1 | 2/2019 | Jeon et al. | |
| 2019/0124334 | A1 | 4/2019 | Sugio et al. | |
| 2019/0124335 | A1 | 4/2019 | Sugio et al. | |
| 2019/0174136 | A1 | 6/2019 | Jun et al. | |
| 2019/0200040 | A1 | 6/2019 | Lim et al. | |
| 2019/0215528 | A1 | 7/2019 | Takehara et al. | |
| 2019/0246129 | A1 | 8/2019 | Zhou | |
| 2020/0007886 | A1 | 1/2020 | Takehara et al. | |
| 2020/0053364 | A1 | 2/2020 | Seo et al. | |
| 2020/0059660 | A1 | 2/2020 | Kim et al. | |
| 2020/0059661 | A1 | 2/2020 | Kim et al. | |
| 2020/0059662 | A1 | 2/2020 | Kim et al. | |
| 2020/0059663 | A1 | 2/2020 | Kim et al. | |
| 2020/0059664 | A1 | 2/2020 | Kim et al. | |
| 2020/0195948 | A1 | 6/2020 | Li et al. | |
| 2020/0236386 | A1 | 7/2020 | Takehara et al. | |
| 2020/0280724 | A1 | 9/2020 | Jeon et al. | |
| 2021/0329260 | A1 | 10/2021 | Jeon et al. | |
| 2022/0060742 | A1 | 2/2022 | Kim et al. | |
| 2023/0147872 | A1 | 5/2023 | Jeon et al. | |
| 2024/0223779 | A1 | 7/2024 | Jeon et al. | |

FOREIGN PATENT DOCUMENTS

| | | | |
|---|---|---|---|
| CN | 103597837 | A | 2/2014 |
| CN | 104185988 | A | 12/2014 |
| CN | 104221380 | A | 12/2014 |
| CN | 107222745 | A | 9/2017 |
| CN | 108353184 | A | 7/2018 |
| JP | 2013-090032 | A | 5/2013 |
| KR | 10-2013-0135368 | A | 12/2013 |
| KR | 10-2014-0005099 | A | 1/2014 |
| KR | 10-2014-0026429 | A | 3/2014 |
| KR | 10-2014-0064944 | A | 5/2014 |
| KR | 10-2014-0077825 | A | 6/2014 |
| KR | 10-2016-0085237 | A | 7/2016 |
| KR | 10-2017-0102845 | A | 9/2017 |
| WO | 2013/070001 | A1 | 5/2013 |
| WO | 2016/034058 | A1 | 3/2016 |
| WO | 2017/039117 | A1 | 3/2017 |

OTHER PUBLICATIONS

Jian-Liang Lin et al., "Non-CE9: CU-based parallel merge mode", Document: JCTVC-H0278, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, pp. 1-4.

Minhua Zhou, "Temporal merging candidate derivation with reduced complexity", Document: JCTVC-I0116, Joint Collaborative Team on Video Coding (JCT-VC) of ITU-T SG16 WP3 and ISO/IEC JTC1/SC29/WG11 9th Meeting: Geneva, Switzerland, Apr. 27-May 7, 2012, pp. 1-11.

Marco Tagliasacchi et al., "Motion Estimation by Quadtree Pruning and Merging", 2006 IEEE, pp. 1861-1864.

Intellectual Property India, Examination Report of corresponding Indian Patent Application No. 201917051907, Apr. 5, 2022.

China National Intellectual Property Administration, Office Action of corresponding CN Patent Application No. 201880035880.2, Nov. 24, 2022.

Jian-Liang Lin et al., "Motion Vector Coding in the HEVC Standard", IEEE Journal of Selected Topics in Signal Processing, Dec. 2013, pp. 957-968, vol. 7, No. 6.

Wang Ri-Xia et al., "Fast Mode Selection Algorithm of H.264 Based on Macroblock-adaptive", Video Engineering, 2009, pp. 14-17, vol. 33, No. 02, China Academic Journal Electronic Publishing House.

China National Intellectual Property Administration, Notice of Allowance of corresponding CN Patent Application No. 201880035880.2, May 2, 2023.

Yu Han et al., "CE4.4.6: Improvement on Merge/Skip mode", Document: JVET-L0399, Joint Video Exploration Team (JVET) of ITU-T SG 16 WP 3 and ISO/IEC JTC 1/SC 29/WG 11, 12th Meeting: Macao, CN, Oct. 3-12, 2018, pp. 1-6.

Jianle Chen et al., "Algorithm Description of Joint Exploration Test Model 6 (JEM 6)", Document: JVET-F1001-v2, Joint Video Exploration Team (JVET) of ITU-T SG 16 WP 3 and ISO/IEC JTC 1/SC 29/WG 11, 6th Meeting: Hobart, AU, Mar 31, 2017-Apr. 7, 2017.

China National Intellectual Property Administration, Office Action of corresponding CN Patent Application No. 202310880322.9, Apr. 11, 2026.

China National Intellectual Property Administration, Office Action of corresponding CN Patent Application No. 202310875543.7, Apr. 28, 2026.

(56) References Cited

OTHER PUBLICATIONS

China National Intellectual Property Administration, Office Action of corresponding CN Patent Application No. 202310876166.9, Apr. 30, 2026.

* cited by examiner

METHOD AND DEVICE FOR PERFORMING MOTION COMPENSATION USING MERGE CANDIDATE LIST

CROSS REFERENCE TO RELATED APPLICATIONS

This application is a Continuation of U.S. patent application Ser. No. 18/117,625 (filed on Mar. 6, 2023), which is a Continuation of U.S. patent application Ser. No. 17/246,525 (filed on Apr. 30, 2021), now issued as U.S. Pat. No. 11,627,330, which is a Divisional of U.S. patent application Ser. No. 16/622,434 (filed on Dec. 13, 2019), now issued as U.S. Pat. No. 11,025,943, which is a National Stage Patent Application of PCT International Patent Application No. PCT/KR2018/012393 (filed on Oct. 19, 2018) under 35 U.S.C. § 371, which claims priority to Korean Patent Application No. 10-2017-0136512 (filed on Oct. 20, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An objective of the present invention is to provide a method and apparatus for effectively performing inter-prediction on an encoding/decoding target block when encoding/decoding a video signal.

Another objective of the present invention is to provide a method and apparatus for deriving a merge candidate on the basis of a block having a predetermined shape or predetermined size when encoding/decoding a video signal.

Still another objective of the present invention is to provide a method and apparatus for performing merging on the basis of a predetermined shape or predetermined size in a parallel processing manner when encoding/decoding a video signal.

Technical problems obtainable from the present invention are non-limited the above-mentioned technical task, and other unmentioned technical tasks can be clearly understood from the following description by those having ordinary skill in the technical field to which the present invention pertains.

Technical Solution

A method and apparatus for decoding a video signal according to the present invention may include: deriving a spatial merge candidate of a current block, generating a merge candidate list of the current block based on the spatial merge candidate, obtaining motion information of the current block based on the merge candidate list, and performing motion compensation on the current block by using the motion information. Herein, the spatial merge candidate of the current block may be derived from at least one spatial neighboring block adjacent to a parent node block including the current block.

A method and apparatus for encoding a video signal according to the present invention may include: deriving a spatial merge candidate of a current block, generating a merge candidate list of the current block based on the spatial merge candidate, obtaining motion information of the current block based on the merge candidate list, and performing motion compensation on the current block by using the motion information. Herein, the spatial merge candidate of the current block may be derived from at least one spatial neighboring block adjacent to a parent node block including the current block.

In the method and apparatus for encoding/decoding a video signal according to the present invention, a spatial it may be determined that block specified by a merge index of a neighboring block of the current block is determined to be not usable as the spatial merge candidate of the current block.

In the method and apparatus for encoding/decoding a video signal according to the present invention, the neighboring block may be a block that is decoded before than the current block.

In the method and apparatus for encoding/decoding a video signal according to the present invention, a spatial merge candidate having a merge candidate identical with a neighboring block of the current block is determined to be not usable.

In the method and apparatus for encoding/decoding a video signal according to the present invention, when a number of samples included in the parent node block is equal to or greater than a predetermined number, the spatial merge candidate of the current block may be derived from at least one spatial neighboring block adjacent to the parent node block.

In the method and apparatus for encoding/decoding a video signal according to the present invention, when a number of child node blocks included in the parent node block satisfies at least one of being equal to or greater than a minimum value, and being equal to or smaller than a maximum value, the spatial merge candidate of the current block may be derived from at least one spatial neighboring block adjacent to the parent node block.

It is to be understood that the foregoing summarized features are exemplary aspects of the following detailed description of the present invention without limiting the scope of the present invention.

Advantageous Effects

According to the present invention, inter-prediction can be effectively performed on an encoding/decoding target block.

According to the present invention, a merge candidate can be derived on the basis of a block having a predetermined shape or predetermined size.

According to the present invention, merging can be performed on the basis of a predetermined shape or predetermined size in a parallel processing manner.

Effects obtainable from the present invention may be non-limited by the above mentioned effect, and other unmentioned effects can be clearly understood from the following description by those having ordinary skill in the technical field to which the present invention pertains.

MODE FOR INVENTION

Figure 1:
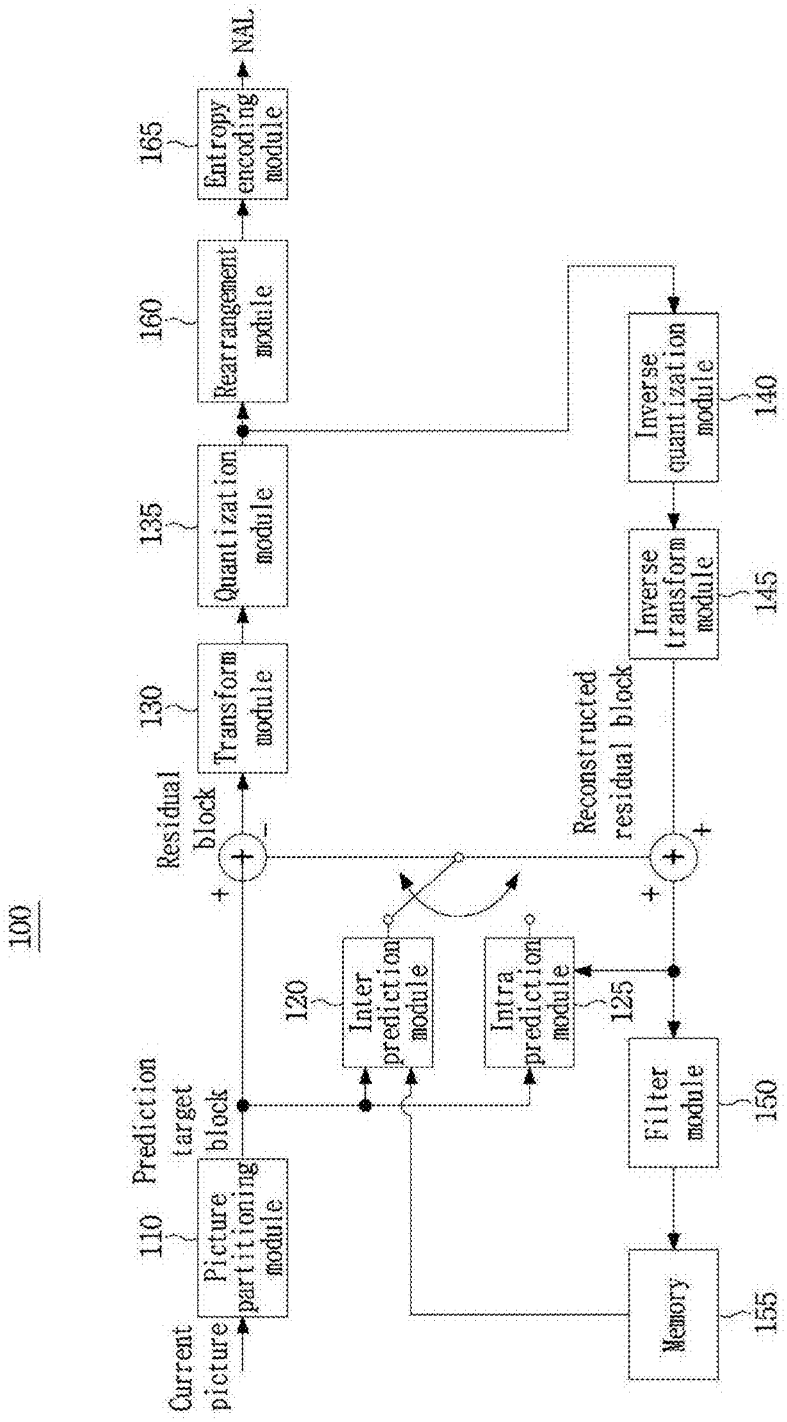
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

In the present disclosure, when an element is referred to as being "connected" or "coupled" to another element, it is understood to include not only that the element is directly connected or coupled to that another element but also that there may be another element therebetween. When an element is referred to as being "directly connected" or "directly coupled" to another element, it is understood that there is no other element therebetween.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
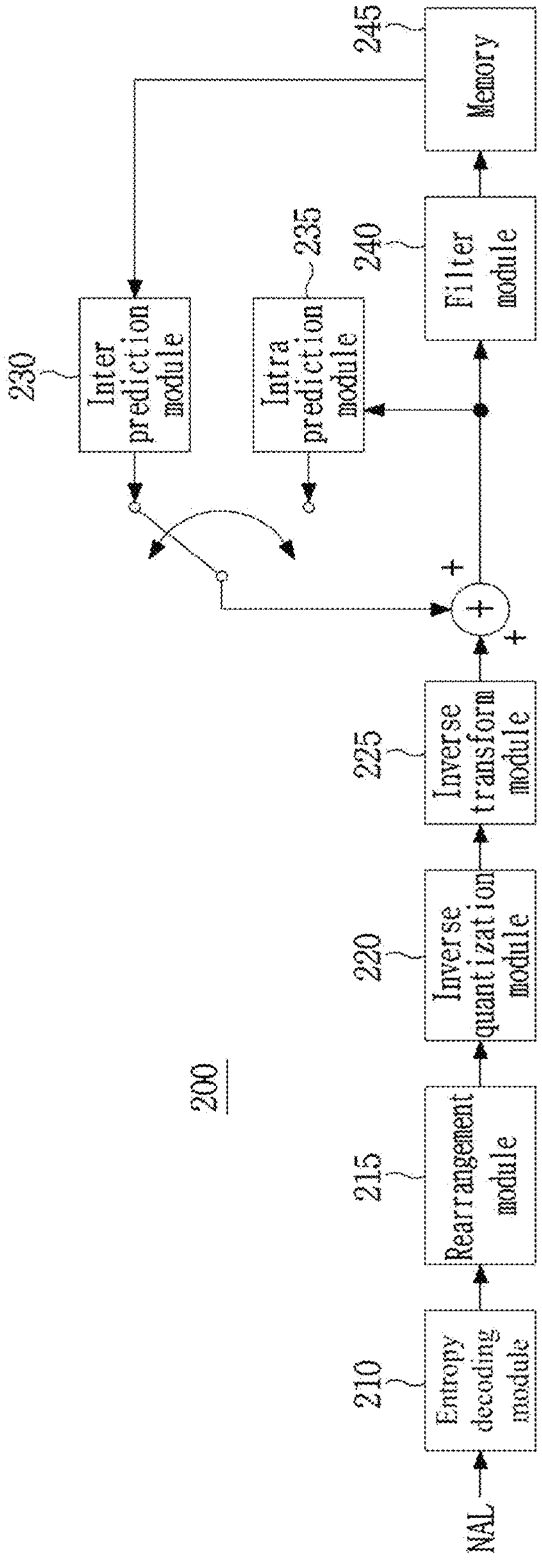
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by being divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line or a horizontal line. In addition, the number of vertical lines or horizontal lines partitioning a coding tree unit or a coding unit may be at least one. For example, by using one vertical line or one horizontal line, a coding tree unit or a coding unit may be partitioned into two partitions, or by using two vertical lines or two horizontal lines, a coding tree unit or a coding unit may be partitioned into three partitions. Alternatively, by using one vertical line and one horizontal line, a coding tree unit or a coding unit may be partitioned into four partitions having a length and width of ½.

When a coding tree unit or a coding unit is partitioned into a plurality of partitions using at least one vertical line or at least one horizontal line, the partitions may have a uniform size or may have different sizes. Alternatively, a partition may have a different size than the other partition.

In the embodiments described below, it is assumed that a coding tree unit or a coding unit is partitioned into a quad tree, triple tree, or binary tree structure. However, a coding tree unit or a coding unit may be partitioned using more vertical lines or more horizontal lines.

Figure 3:
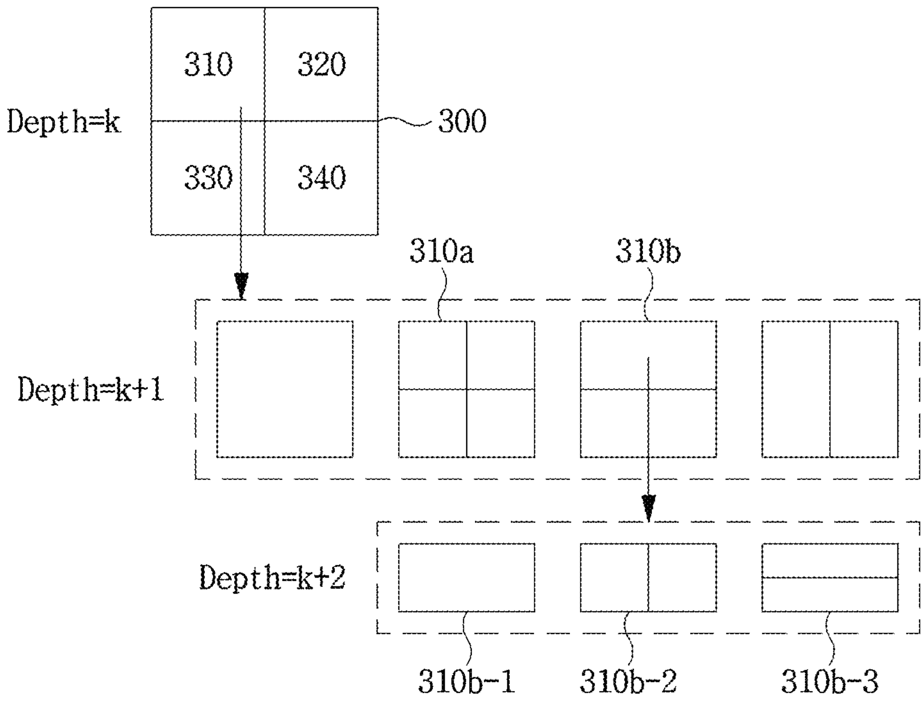
FIG. 3 is a diagram illustrating an example of hierarchically partitioning a coding block based on a tree structure as an embodiment to which the present invention is applied.

FIG. 3 is a diagram illustrating an example of hierarchically partitioning a coding block based on a tree structure as an embodiment to which the present invention is applied.

The input video signal is decoded in a unit of a predetermined block, and the base unit for decoding the input video signal is referred to as a coding block. The coding block may be a unit for performing intra/inter prediction, transformation, quantization. In addition, a prediction mode (e.g., intra prediction mode or inter prediction mode) may be determined in a unit of a coding block, and prediction blocks included in the coding block may share the determined prediction mode. A coding block may be a square or non-square block with any size in the range 8×8 to 64×64, and may be a square or non-square block with a size of 128×128, 256×256 or more.

Specifically, a coding block may be hierarchically partitioned based on at least one of a quad tree, a triple tree, and a binary tree. Here, quad tree-based partitioning may correspond to a method in which a 2N×2N coding block is partitioned into four N×N coding blocks, triple tree-based partitioning may correspond to a method in which one coding block is partitioned into three coding blocks, and binary tree-based partitioning may correspond to a method in which one coding block is partitioned into two coding blocks. Even when triple tree-based or binary tree-based partitioning is performed, a square coding block may exist at a lower depth. Alternatively, after triple tree-based or binary tree-based partitioning is performed, generating a square coding block may be limited at a lower depth.

Figure 4:
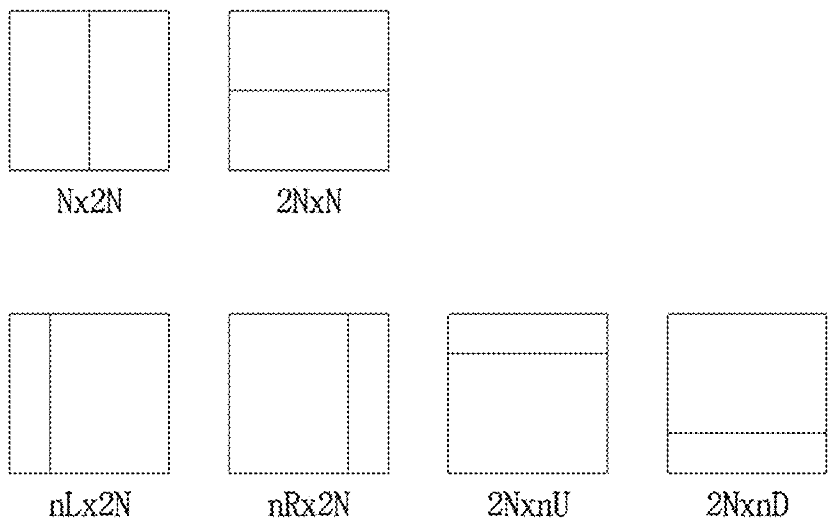
FIG. 4 is a diagram illustrating a partition type in which a binary tree-based partitioning is allowed as an embodiment to which the present invention is applied.

Binary tree-based partitioning may be performed symmetrically or asymmetrically. A coding block partitioned based on a binary tree may be a square block or a non-square block such as a rectangle. For example, a partition type that allows binary tree-based partitioning may include at least one of 2N×N (horizontal non-square coding unit) or N×2N (vertical non-square coding unit) which are examples of symmetric, nL×2N, nR×2N, 2N×nU or 2N×nD which are examples of asymmetric, as in the example shown in FIG. 4.

Binary tree-based partitioning may limitedly allow either symmetric partition or asymmetric partition. In this case, configuring a coding tree unit as a square block may correspond to quad tree CU partitioning, and configuring a coding tree unit as a symmetric non-square block may correspond to binary tree partitioning. Configuring a coding tree unit into a square block and a symmetric non-square block may correspond to quad and binary tree CU partitioning.

Binary tree-based partitioning may be performed on a coding block in which quad tree-based partitioning is no longer performed. A coding block partitioned based on a binary tree may be configured such that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a binary tree, and only one of a horizontal or vertical partitioning may be limited allowed.

For example, according to a position, an index, a shape, an additional partitioning shape of a neighboring partition, or the like of a coding block partitioned based on a binary tree, additional partitioning or additional partitioning direction may be limited for a coding block partitioned based on a binary tree. For example, among two coding blocks generated by a binary tree-based partitioning, assuming that an index of a coding block having an earlier coding order is 0 (hereinafter, referred to as a coding block index 0) and an index of a coding block having a later coding order is 1 (hereinafter, referred to as coding block index 1), when a binary tree-based partitioning is applied both of coding blocks of coding block index 0 and coding block index 1, a binary tree-based partitioning direction of the coding block having coding block index 1 may be determined according to a binary tree-based partitioning direction of the coding block having coding block index 0. Specifically, when a binary tree-based partitioning direction of the coding block having coding block index 0 partitions the coding block having coding block index of 0 into square partitions, a binary tree-based partitioning of the coding block having coding block index 1 may have a different direction from a binary tree-based partitioning of the coding block having coding block index 1. That is, partitioning both of the coding blocks having coding block index 0 and coding block index 1 into square partitions may be limited. In this case, encoding/decoding of information indicating a binary tree partitioning direction of a coding block having coding block index 1 may be omitted. Partitioning both of the coding blocks having coding block index 0 and coding block index 1 into square partitions has the same effect as partitioning an upper depth block based on a quad tree, and thus allowing partitioning both of the coding blocks having coding block index 0 and coding block index 1 into square partitions is undesirable in terms of coding efficiency.

Triple tree-based partitioning means partitioning a coding block into three partitions in a horizontal or vertical direction. All three partitions generated by triple tree-based partitioning may have different sizes. Alternatively, two of the partitions generated by triple tree-based partitioning may have the same size, and the other one may have a different size. For example, the width ratio or height ratio of partitions generated by partitioning a coding block may be set to 1:n:1, 1:1:n, n:1:1 or m:n:1 depending on a partitioning direction. Here, m and n may be 1 or a real number greater than 1, for example, an integer such as 2.

Triple tree-based partitioning may be performed on a coding block in which quad tree-based partitioning is no longer performed. For a coding block partitioned based on a triple tree, it may be configured that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a triple tree, and only one of horizontal partitioning or vertical partitioning may be limitedly allowed.

For example, according to a position, an index, a shape, an additional partitioning shape of a neighboring partition, or the like of a coding block partitioned based on a triple tree, additional partitioning or additional partitioning direction may be limited for a coding block partitioned based on a triple tree. For example, one of horizontal partitioning or vertical partitioning may be limited to a partition having the largest size among coding blocks generated by triple tree-based partitioning. Specifically, for a partition having the largest size among coding blocks generated by triple tree-based partitioning, binary tree partitioning or triple tree partitioning having the same direction as the triple tree partitioning direction of an upper depth partition may not be allowed. In this case, for a partition having the largest size among coding blocks generated by triple tree-based partitioning, encoding/decoding of information indicating a binary tree partitioning direction or a triple tree partitioning direction may be omitted.

Depending on a size or shape of a current block, partitioning based on a binary tree or triple tree may be limited. Here, the size of the current block may be expressed based on at least one of the width, height, minimum/maximum of width/height, summation of width and height, multiplication of width and height of the current block, or the number of samples included in the current block. For example, when at least one of the width or height of the current block is larger than a predefined value, partitioning based on a binary tree or triple tree may not be allowed. Here, the predefined value may be an integer such as 16, 32, 64, or 128. As another example, when the width-to-height ratio of the current block is larger than a predefined value or smaller than a predefined value, partitioning based on a binary tree or triple tree may not be allowed. When the predefined value is 1, partitioning based on a binary tree or triple tree may be allowed only when the current block is a square block having the same width and height.

Partitioning of a lower depth may be dependently determined based on a partitioning shape of an upper depth. For example, when binary tree-based partitioning is allowed in two or more depths, binary tree-based partitioning of the same shape as a binary tree partitioning of an upper depth may be allowed in a lower depth. For example, when binary tree-based partitioning of 2N×N shape is performed at an upper depth, binary tree-based partitioning of 2N×N shape may also be performed at a lower depth. Alternatively, when binary tree-based partitioning of N×2N shape is performed at an upper depth, binary tree-based partitioning of N×2N shape may also be performed at a lower depth.

In addition, only binary tree-based partitioning of a shape different from a binary tree partitioning shape of an upper depth may be allowed in a lower depth.

For a sequence, slice, coding tree unit, or coding unit, it may be limited such that only a specific shape of binary tree-based partitioning or a specific shape of triple tree-based partitioning is to be used. For example, it may be limited to allow only binary tree-based partitioning of 2N×N or N×2N shape for a coding tree unit. The allowed partition type may be predefined in an encoder or decoder, or may be signaled through a bitstream by encoding information on an allowed partition type or non-allowed partition type.

Figure 5A:
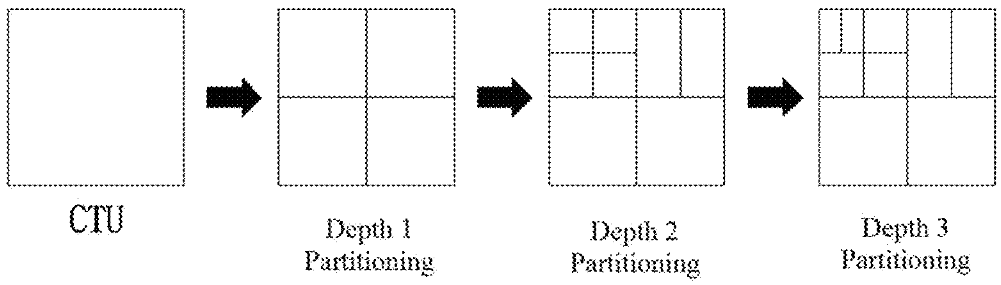
FIGS. 5A and 5B are diagrams illustrating an example in which only a specific shape of binary tree-based partitioning is allowed.
Figure 5B:
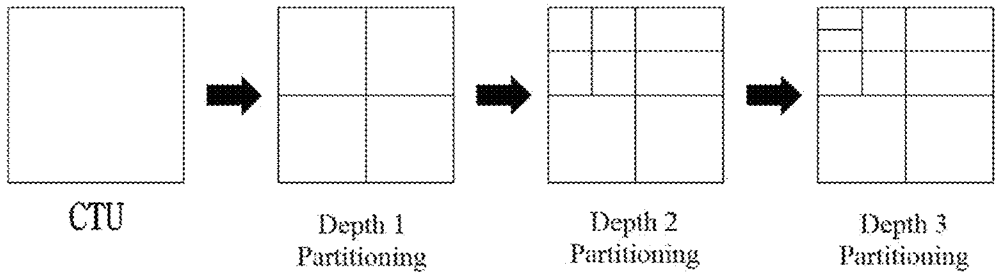

FIGS. 5A and 5B are diagrams illustrating an example in which only a specific shape of binary tree-based partitioning is allowed. In FIG. 5A, illustrates an example in which only N×2N shape of binary tree-based partitioning is allowed, and FIG. 5B illustrates an example in which only 2N×N shape of binary tree-based partitioning is allowed. For implementing adaptive partitioning based on a quad tree or binary tree, information indicating quad tree-based partitioning, information on a size/depth of a coding block that allows quad tree-based partitioning, information indicating binary tree-based partitioning, information on a size/depth of a coding block that allows binary tree-based partitioning, information on a size/depth of a coding block that does not allow binary tree-based partitioning, information whether a binary tree-based partitioning is vertical or horizontal, or the like may be used.

In addition, for a coding tree unit or a predetermined coding unit, a number of times that binary tree partitioning/triple tree partitioning is allowed, a depth that binary tree partitioning/triple tree partitioning is allowed, a number of depths that binary tree partitioning/triple tree partitioning is allowed, or the like may be obtained. The information may be encoded in a unit of a coding tree unit or a coding unit and transmitted to a decoder through a bitstream.

For example, through a bitstream, a syntax 'max_binary_depth_idx_minus1' indicating a maximum depth that binary tree partitioning is allowed may be encoded/decoded. In this case, max_binary_depth_idx_minus1+1 may indicate the maximum depth that binary tree partitioning is allowed.

Figure 6:
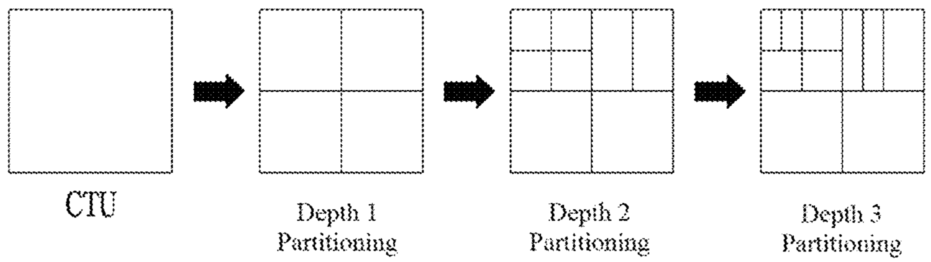
FIG. 6 is a diagram for describing an example in which information related to a number of times allowed for a binary tree partitioning is encoded/decoded according to an embodiment to which the present invention is applied.

Referring to the example shown in FIG. 6, in FIG. 6, it is shown that binary tree partitioning is performed for a coding unit having a depth of 2 and a coding unit having a depth of 3. Accordingly, at least one of information indicating the number of times (2 times) that binary tree partitioning has been performed in the coding tree unit, information indicating the maximum depth (depth 3) that binary tree partitioning is allowed in the coding tree unit, or the number of depths (2 depths, depth 2 and depth 3) that binary tree partitioning is allowed in the coding tree unit may be encoded/decoded through the bitstream.

As another example, at least one of a number of times that binary tree partitioning/triple tree partitioning is allowed, a depth that binary tree partitioning/triple tree partitioning is allowed, or a number of depths that binary tree partitioning/triple tree partitioning is allowed may be obtained for each sequence, picture, or slice. For example, the information may be encoded in a unit of a sequence, a picture or a slice and transmitted through a bitstream. Alternatively, a depth that binary tree partitioning/triple tree partitioning is allowed, a number of depths that binary tree partitioning/triple tree partitioning is allowed may be predefined for each sequence, picture, or slice. Accordingly, for a first slice and a second slice, at least one of a number of times that binary tree partitioning/triple tree partitioning is allowed, a depth that binary tree partitioning/triple tree partitioning is allowed, or a number of depths that binary tree partitioning/triple tree partitioning is allowed may differ. For example, in the first slice, binary tree partitioning may be allowed only at one depth, while in the second slice, binary tree partitioning may be allowed at two depths.

As another example, at least one of a number of times that binary tree/triple tree partitioning is allowed, a depth that binary tree/triple tree partitioning is allowed, or a number of depths that binary tree/triple tree partitioning is allowed may be set differently according to a temporal level identifier (TemporalID) of a slice or picture. Here, the temporal level identifier (TemporalID) is used to identify each of a plurality of layers of an image having a scalability of at least one of view, spatial, temporal, or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310*a* having the half width and the half height of the second coding block, and the partition depth of the third coding block 310*a* may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310*a* may be determined as a leaf coding block, or may be further partitioned based on the quad tree or the binary tree.

In the meantime, the third coding block 310*b* partitioned based on the binary tree may be further partitioned into coding blocks 310*b*-2 of a vertical direction or coding blocks 310*b*-3 of a horizontal direction based on the binary tree, and the partition depth of the relevant coding blocks may be increased to k+3. Alternatively, the third coding block 310*b* may be determined as a leaf coding block 310*b*-1 that is no longer partitioned based on the binary tree. In this case, the coding block 310*b*-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree, and a triple tree, a coding unit may be represented as square or rectangular shape of an arbitrary size.

A coding block may be encoded/decoded using at least one of a skip mode, an intra prediction, an inter prediction, or a skip method.

As another example, intra prediction or inter prediction may be performed in a unit having a size equal to or smaller than a coding block through partitioning of the coding block. To this end, when a coding block is determined, a prediction block may be determined through predictive partitioning of the coding block. Predictive partitioning of a coding block may be performed by a partition mode (Part_mode) indicating a partition type of the coding block. The size or shape of the prediction block may be determined according to the partition mode of the coding block. For example, the size of the prediction block determined according to the partition mode may have a value equal to or smaller than the size of the coding block.

Figure 7:
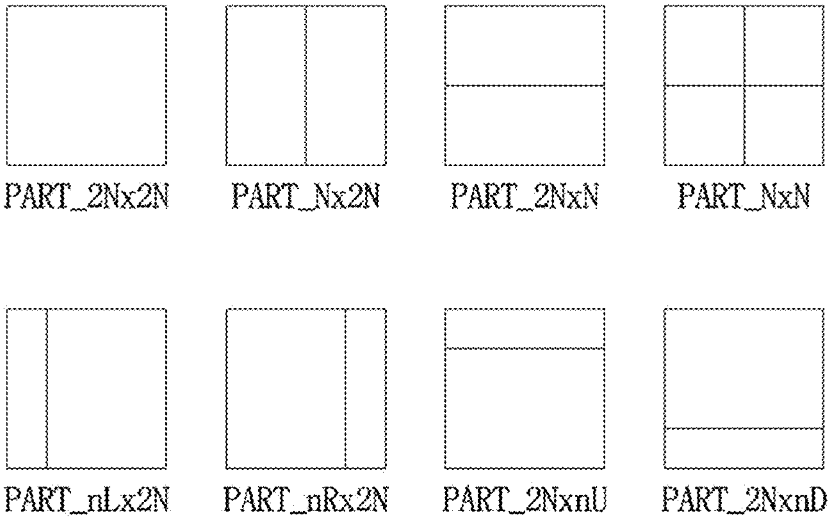
FIG. 7 is a diagram illustrating a partition mode that may be applied to a coding block as an embodiment to which the present invention is applied.

FIG. 7 is a diagram illustrating a partition mode that may be applied to a coding block when the coding block is encoded by inter prediction.

When a coding block is encoded by inter prediction, any one of eight partition modes may be applied to the coding block, as in the example illustrated in FIG. 7.

When a coding block is encoded by intra prediction, partition mode PART_2N×2N or PART_N×N may be applied to the coding block.

PART_N×N may be applied when a coding block has a minimum size. Here, the minimum size of the coding block may be predefined in an encoder and a decoder. Alternatively, information on the minimum size of the coding block may be signaled through a bitstream. For example, the minimum size of the coding block may be signaled through a slice header, and accordingly, the minimum size of the coding block may be defined for each slice.

In general, a size of a prediction block may have a size of 64×64 to 4×4. However, when a coding block is encoded by inter prediction, when a motion compensation is performed, a prediction block may not have a size of 4×4 in order to reduce a memory bandwidth.

Figure 8:
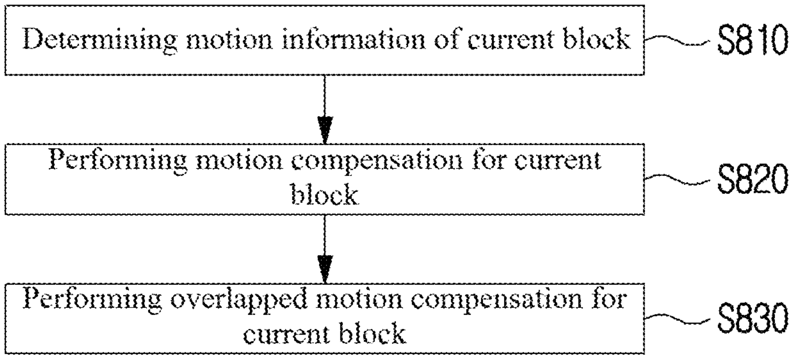
FIG. 8 is a flowchart illustrating an inter prediction method as an embodiment to which the present invention is applied.

FIG. 8 is a flowchart illustrating an inter prediction method as an embodiment to which the present invention is applied.

Referring to FIG. 8, motion information of a current block may be determined S810. The motion information of the current block may include at least one of a motion vector of the current block, a reference picture index of the current block, or an inter prediction direction of the current block.

The motion information of the current block may be obtained based on at least one of information signaled through a bitstream or motion information of a neighboring block neighboring the current block.

Figure 9:
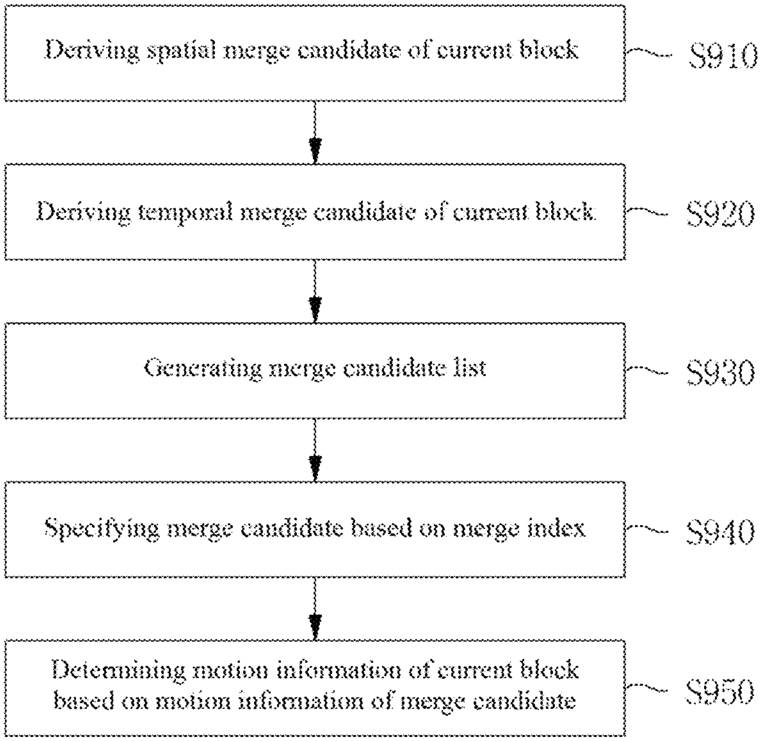
FIG. 9 is a diagram illustrating a procedure of deriving motion information of a current block when a merge mode is applied to the current block.

FIG. 9 is a diagram illustrating a procedure of deriving motion information of a current block when a merge mode is applied to the current block.

A merge mode represents a method of deriving motion information of a current block from a neighboring block.

When a merge mode is applied to a current block, a spatial merge candidate may be derived from a spatial neighboring block of a current block S910. The spatial neighboring block may include at least one of a block adjacent to a top, left, or corner (e.g., at least one of a top left corner, a right top corner, or a left bottom corner) of the current block.

Figure 10:
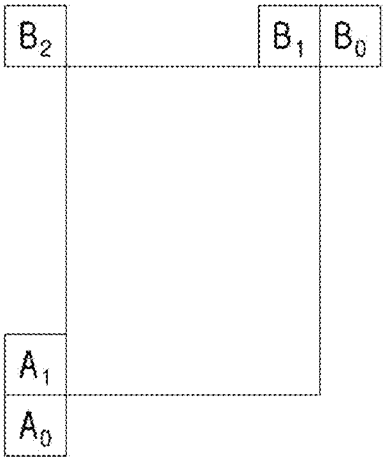
FIG. 10 is a diagram showing an example of a spatial neighboring block.

FIG. 10 is a diagram showing an example of a spatial neighboring block.

As an example shown in FIG. 10, a spatial neighboring block may include at least one of a neighboring block $A_1$ adjacent to a left of a current block, a neighboring block $B_1$ adjacent to a top of the current block, a neighboring block $A_0$ adjacent to a bottom-left corner of the current block, a neighboring block $B_0$ adjacent to a top-right corner of the current block, and a neighboring block $B_2$ adjacent to a top-left corner of the current block.

Expanding further an example of FIG. 10, a spatial merge candidate may be derived from at least one of a block adjacent to a top-left sample of a current block, a block adjacent to a top-center sample of the current block, and a block adjacent to a top-right sample of the current block. Alternatively, a spatial merge candidate may be derived from at least one of a block adjacent to a top-left sample of the current block, a block adjacent to a left-center sample of the current block, and a block adjacent to a bottom-left sample of the current block. According to a shape of a current block, whether or not an expanded spatial neighboring block is usable may be determined. In an example, when a current block is a non-square block where a width is greater than a height, it may be determined that a block adjacent to a top-left sample of the current block, a block adjacent to a left-center sample, or a block adjacent to a bottom-left sample of the current block is not usable. Meanwhile, when a current block is a block where a height is greater than a width, it may be determined that a block adjacent to a top-left sample of the current block, a block adjacent to a top-center sample, or a block adjacent to a top-right sample of the current block is not usable.

A spatial merge candidate may be derived from spatial non-neighboring blocks that are not adjacent to a current block. A spatial non-neighboring block may include a sample at the same vertical line, horizontal line, or diagonal line with a spatial neighboring block adjacent to the current block. Accordingly, a spatial non-neighboring block may include at least one of a block at the same vertical line with a block adjacent to the top, top-right corner, or top-left corner of the current block, a block at the same horizontal line with a block adjacent to a left, bottom-left corner, or top-left corner of the current block, or a block at the same diagonal line with a block adjacent to the corner of the current block.

Figure 11:
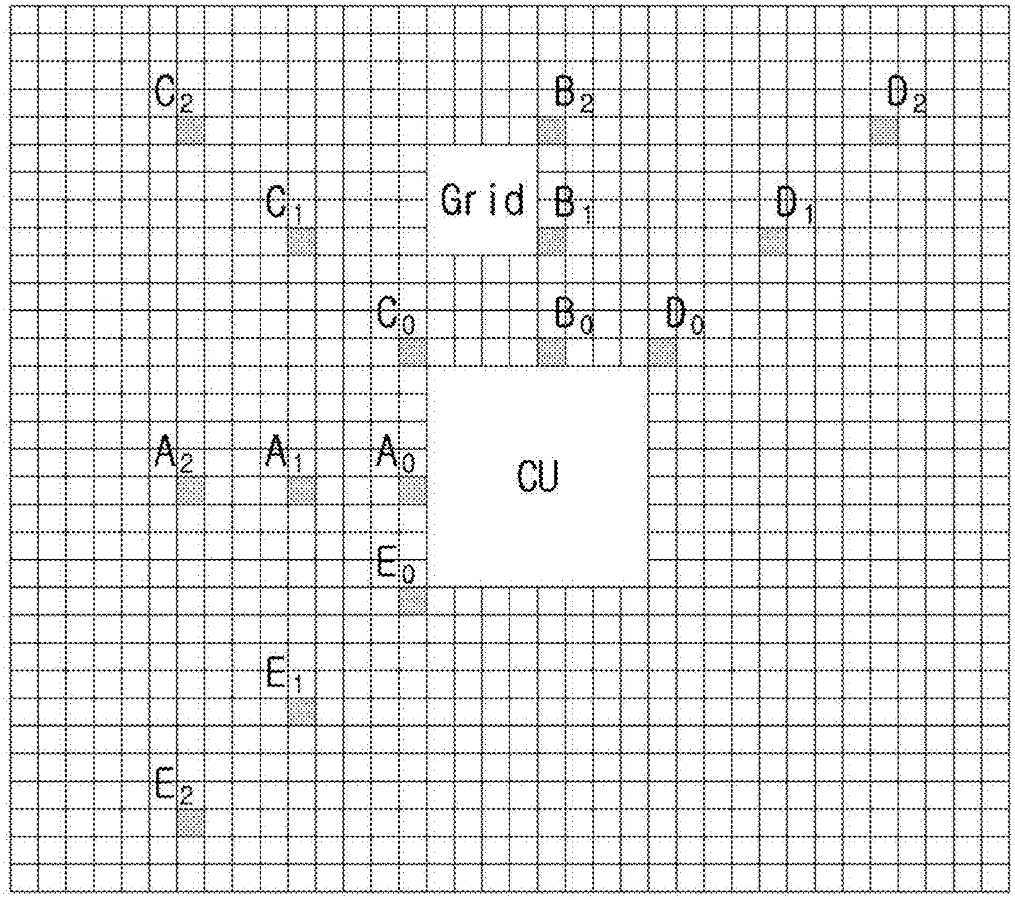
FIG. 11 is a diagram showing an example of a spatial non-neighboring block.

FIG. 11 is a diagram showing an example of a spatial non-neighboring block.

A position of a spatial non-neighboring block may be represented by using a neighboring block where an x coordinate and a y coordinate of the spatial non-neighboring block are increased/decreased by a width/height of a block unit (represented as "grid" in FIG. 11) from the neighboring block. In other words, a position of the spatial non-neighboring sample may be obtained by increasing/decreasing in an x coordinate and a y coordinate by a width/height of the block unit from the spatial neighboring sample or spatial non-adjacent sample positioned at the same horizontal line, vertical line, or diagonal line. For example, a spatial non-neighboring block A1 may include a spatial non-neighboring sample where an x coordinate is decreased by −4 from a spatial neighboring block A0, and a spatially non-neighboring block A2 may include a spatial non-neighboring sample where an x coordinate is decreased by −4 from the spatial non-neighboring block A1.

A block unit may have a size of 4×4, 8×8 or greater. Alternatively, according to a shape of a current block, a block unit may be set to a non-square shape. In an example, when a current block is a non-square, a block unit may have a shape of 2×4, 2×8, 4×2, or 8×2, etc.

Alternatively, a size of a block unit may be determined according to a width or height of a current block. For example, a width/height of a block unit may be set to be half of a width/height of a current block. In an example, when a width of a current block is 8, a width of a block unit may be set to 4, and when a width of a current block is 16, a width of a block unit may be set to 8. Similarly, when a height of a current block 8, a height of a block unit may be set to 4, and when a height of a current block is 16, a height of a block unit may be set to 8.

When a current block and a spatial non-adjacent sample are not included in the same CTU, a spatial merge candidate may be derived by using a sample adjacent to a CTU boundary. Herein, a sample adjacent to a CTU boundary may represent a sample included in a CTU different with the current block, or represent a sample included in the same CTU with the current block.

Figure 12:
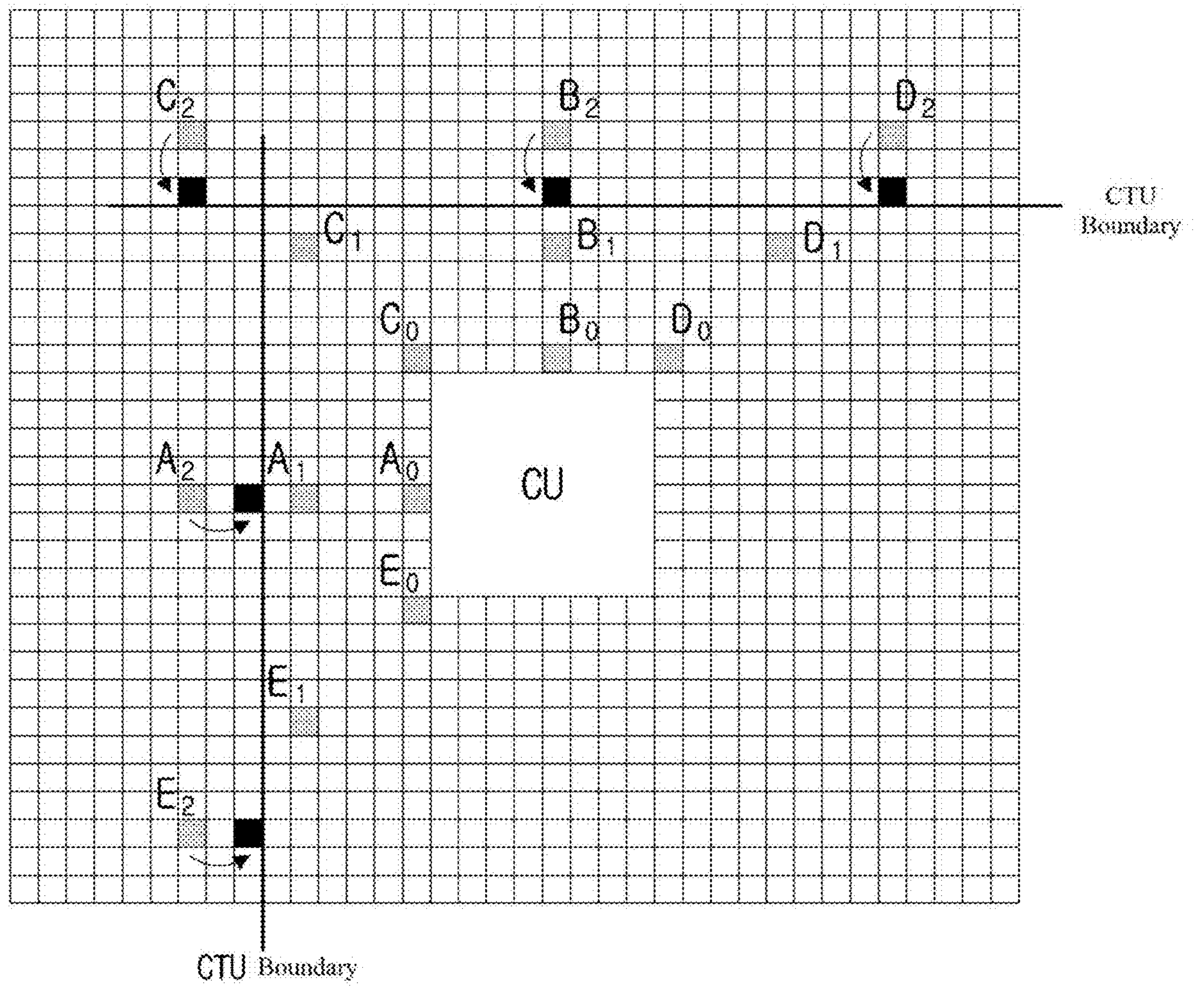
FIG. 12 is a diagram showing an example of replacing a spatial non-neighboring sample that is not included in the same CTU with a current block with a sample adjacent to the CTU.

FIG. 12 is a diagram showing an example of replacing a spatial non-neighboring sample that is not included in the same CTU with a current block with a sample adjacent to the CTU.

As an example shown in FIG. 12, when a spatial non-adjacent sample is not included in the same CTU with a current block, a merge candidate of the current block may be derived by using at least one sample adjacent to the CTU. Herein, when a spatial non-adjacent sample is positioned at a top part of the current block (that is, when a y coordinate of a spatial neighboring block is smaller than a y coordinate of a top-left sample of the current block), a sample positioned at the same vertical line with the spatial non-neighboring sample may be used among samples adjacent to the CTU. Alternatively, among samples adjacent to the CTU, a sample obtained by adding or subtracting an offset to/from an x coordinate of a spatial non-neighboring sample may be used.

However, when a spatial non-adjacent sample is positioned at a left part of the current block (that is, when an x coordinated of a spatial neighboring sample is smaller than an x coordinate of the top-left sample of the current block), a sample positioned at the same horizontal line with the spatial non-neighboring sample may be used among samples adjacent to the CTU. Alternatively, among samples adjacent to the CTU, a sample obtained by adding or subtracting an offset to/from a y coordinate of a spatial non-neighboring sample may be used.

Unlike to the example shown in FIG. 12, when a spatial non-neighboring sample positioned at the diagonal line from a corner of the current block is not included in the same CTU with the current block, among samples adjacent to the CTU, a sample positioned at the diagonal line with the spatial non-neighboring sample may be used so as to derive a merge candidate of the current block.

Searching for a merge candidate may be performed in an order of a spatial neighboring block, and a spatial non-neighboring block. Alternatively, when a neighboring block adjacent to the current block is not usable as a merge candidate, a block that is not adjacent to the current block may be used as a merge candidate of the current block.

Motion information of a spatial merge candidate may be set to be identical to motion information of a spatial neighboring block/spatial non-neighboring block.

A spatial merge candidate may be determined by searching of neighboring blocks in a predetermined order. In an example, in an example shown in FIG. 10, searching for determining a spatial merge candidate may be performed in an order of blocks $A_1$, $B_1$, $B_0$, $A_0$, and $B_2$. Herein, a block $B_2$ may be used when at least one of remaining blocks (that is, $A_1$, $B_1$, $B_0$, and $A_0$) is not present or at least one is encoded through an intra-prediction mode.

An order of searching for a spatial merge candidate may be predefined in the encoder/decoder. Alternatively, an order of searching for a spatial merge candidate may be adaptively determined according to a size or shape of a current block. Alternatively, an order of searching for a spatial merge candidate may be determined on the basis of information signaled through a bitstream.

A temporal merge candidate may be derived from a temporal neighboring block of a current block S920. The temporal neighboring block may mean a co-located block included in a co-located picture. The co-located picture has a POC differing from a current picture including the current block. The co-located picture may be determined as a picture having a predefined index within a reference picture list or as a picture having a POC difference with the current picture being minimum. Alternatively, the co-located picture may be determined by information signaled through a bitstream. Information signaled through a bitstream may include at least one of information indicating a reference picture list (e.g., L0 reference picture list or L1 reference picture list) including the co-located picture and an index indicating the co-located picture within the reference picture list. Information for determining the co-located picture may be signaled in at least one of a picture parameter set, a slice header, and a block level.

Motion information on a temporal merge candidate may be determined on the basis of motion information a co-located block. In an example, a motion vector of a temporal merge candidate may be determined on the basis of a motion vector of a co-located block. For example, a motion vector of a temporal merge candidate may be set to be identical to a motion vector of a co-located block. Alternatively, a motion vector of a temporal merge candidate may be derived by scaling a motion vector of a co-located block on the basis of at least one of a POC difference between a current picture and a reference picture of the current block, and a POC difference between a co-located picture and a reference picture of the co-located.

Figure 13:
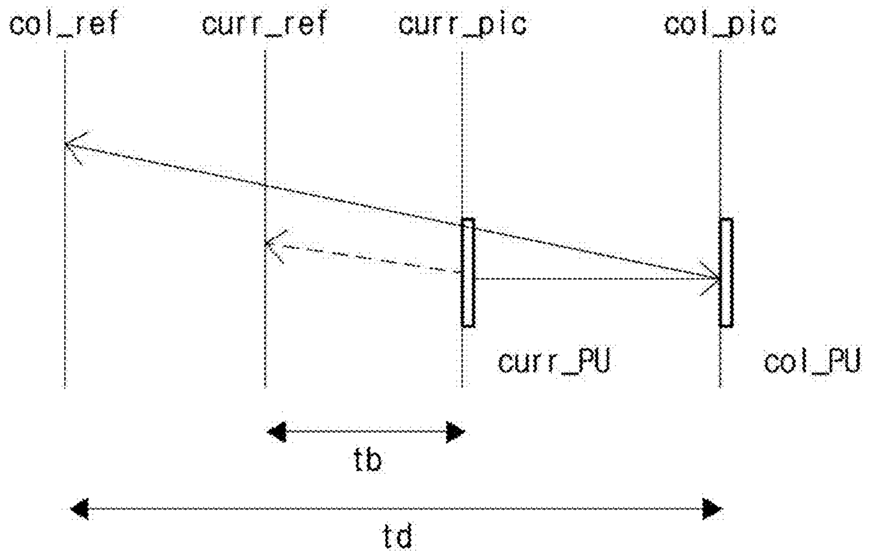
FIG. 13 is a diagram showing an example of deriving a motion vector of a temporal merge candidate.

FIG. 13 is a diagram showing an example of deriving a motion vector of a temporal merge candidate.

In an example shown in FIG. 13, tb represents a POC difference between a current picture curr_pic and a reference picture curr_ref of the current picture, and td represents a POC difference between a co-located picture col_pic and a reference picture col_ref of the co-located block. A motion vector of a temporal merge candidate may be derived by scaling a motion vector of the co-located block col_PU on the basis of tb and/or td.

Alternatively, taking into account of whether or not a co-located block is usable, a motion vector of the co-located block and a motion vector obtained by scaling the motion vector of the co-located block may be used as a motion vector of a temporal merge candidate. In an example, a motion vector of a co-located block is set as a motion vector of a first temporal merge candidate, and a value obtained by scaling the motion vector of the co-located block may be set as a motion vector of a second temporal merge candidate.

An inter-prediction direction of a temporal merge candidate may be set to be identical to an inter-prediction direction of a temporal neighboring block. However, a reference picture index of the temporal merge candidate may have a fixed value. In an example, a reference picture index of a temporal merge candidate may be set to "0". Alternatively, a reference picture index of a temporal merge candidate may be adaptively determined on the basis of at least one of a reference picture index of a spatial merge candidate, a reference picture index of a current picture.

A specific block having the same position and size with a current block within a co-located picture, or a block adjacent to a block adjacent to a block having the same position and size with the current block may be determined as a co-located block.

Figure 14:
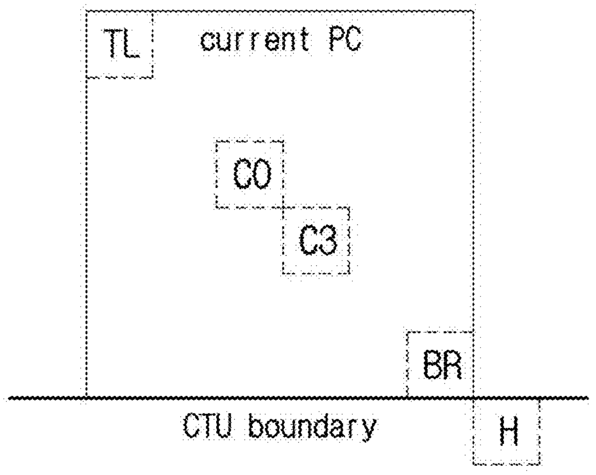
FIG. 14 is a diagram showing a position of candidate blocks that are possibly used as a co-located block.

FIG. 14 is a diagram showing a position of candidate blocks that are possibly used as a co-located block.

A candidate block may include at least one of a block adjacent to a position of a top-left corner of a current block within a co-located picture, a block adjacent to a position of a center sample of the current block within the co-located picture, and a block adjacent to a position of a bottom-left corner of the current block within the co-located picture.

In an example, a candidate block may include at least one of a block TL including a position of a top-left sample of a current block within a co-located picture, a block BR including a position of a bottom-right sample of the current block within the co-located picture, a block H adjacent to a bottom-right corner of the current block within the co-located picture, a block C3 including a position of a center sample of the current block within the co-located picture, and a block C0 adjacent to the center sample of the current block (for example, a block including a position of a sample spaced apart from the center sample of the current block by (−1, −1)) within the co-located picture.

In addition to the example shown in FIG. 14, a block including a position of a neighboring block adjacent to a predetermined boundary of a current block within the co-located picture may be selected as a co-located block.

The number of temporal merge candidates may be 1 or more. In an example, at least one temporal merge candidate may be derived on the basis of at least one co-located block.

Information on the maximum number of temporal merge candidates may be encoded and signaled through the encoder. Alternatively, the maximum number of temporal merge candidates may be derived on the basis of the maximum number of merge candidates and/or the maximum number of spatial merge candidates which are possible included in a merge candidate list. Alternatively, the maximum number of temporal merge candidates may be determined on the basis of the number of usable co-located blocks.

Whether or not candidate blocks are usable may be determined according to a predetermined priority, and at least one co-located block may be determined on the basis of the above determination and the maximum number of temporal merge candidates. In an example, when a block C3 including a position of a center sample of a current block and a block H adjacent to a bottom-right corner of the current block are candidate blocks, any one of the block C3 and the block H may be determined as a co-located block. When the block H is available, the block H may be determined as a co-located block. However, when the block H is not available (for example, when the block H is encoded through intra-prediction, when the block H is not usable or when the block H is positioned outside of the largest coding unit (LCU), etc.), a block C3 may be determined as a co-located block.

In another example, when at least one of a plurality of blocks adjacent to a bottom-right corner position of a current block within a co-located picture is unavailable (for example, a block H and/or a block BR), the unavailable block may be replaced with another available block. Another available block that is replaced with a unavailable block may include at least one a block (for example, C0 and/or C3) adjacent to a center sample position of a current block within a co-located picture, and a block (for example, TL) adjacent to a bottom-left corner of the current block with the co-located picture.

When at least one of a plurality of blocks adjacent to a center sample position of a current block within a co-located picture is unavailable or when at least one of a plurality of blocks adjacent to a top-left corner position of the current block within the co-located picture is unavailable, the unavailable block may be replaced with another available block.

Subsequently, a merge candidate list including the spatial merge candidate and the temporal merge candidate may be generated S930. When configuring a merge candidate list, a merge candidate having motion information identical with an existing merge candidate may be removed from the merge candidate list.

Information on the maximum number of merge candidates may be signaled through a bitstream. In an example, information indicating the maximum number of merge candidates may be signaled through a sequence parameter or picture parameter. In an example, when the maximum number of merge candidates is five, a total of five spatial merge candidates and temporal merge candidates may be selected. For example, four spatial merge candidates may be selected from five merge candidates, and one temporal merge candidate may be selected from two temporal merge candidates. When the number of merge candidates included in the merge candidate list is smaller than the maximum number of merge candidates, a combined merge candidate obtained by combining at least two merge candidates or a merge candidate having a motion vector of (0,0) (zero motion vector) may be included in the merge candidate list.

Alternatively, an average merge candidate obtained by calculating an average motion vector of at least two merge candidates may be included in a merge candidate list. An average merge candidate may be derived by calculating an average motion vector of at least two merge candidates included in a merge candidate list. In an example, when a first merge candidate and a second merge candidate are added to a merge candidate list, an average of a motion vector of the first merge candidate and a motion vector of the second merge candidate may be calculated so as to obtain an average merge candidate. In detail, an L0 motion vector of an average merge candidate may be derived by calculating an average of an L0 motion vector of the first merge candidate and an L0 motion vector of the second merge candidate, and an L1 motion vector of the average merge candidate may be derived by calculating an average of an L1 motion vector of the first merge candidate and an L1 motion vector of the second merge candidate. When bi-directional prediction is applied to any one of a first merge candidate and a second merge candidate, and uni-directional prediction is performed to the other one, a motion vector of the bi-directional merge candidate may be set as it is to an L0 motion vector or L1 motion vector of an average merge candidate. In an example, when L0 directional and L1 directional predictions are performed on a first merge candidate, but L0 directional prediction is performed on a second merge candidate, an L0 motion vector of an average merge candidate may be derived by calculating an average of an L0 motion vector of the first merge candidate and an L0 motion vector of the second merge candidate. Meanwhile, an L1 motion vector of the average merge candidate may be derived as an L1 motion vector of the first merge candidate.

When a reference picture of a first merge candidate differs with a second merge candidate, a motion vector of the first merge candidate or second merge candidate may be scaled according to a distance (that is, POC difference) between reference pictures of respective merge candidates and a current picture. For example, after scaling a motion vector of a second merge candidate, an average merge candidate may be derived by calculating an average of a motion vector of a first merge candidate and the scaled motion vector of the second merge candidate. Herein, priorities may be set on the basis of a value of a reference picture index of each merge candidate, a distance between a reference picture of each merge candidate and a current block, or whether or not bi-directional prediction is applied, and scaling may be applied to a motion vector of a merge candidate having high (or low) priority.

A reference picture index of an average merge candidate may be set to indicate a reference picture at a specific position within a reference picture list. In an example, a reference picture index of an average merge candidate may indicate the first or last reference picture within a reference picture list. Alternatively, a reference picture index of an average merge candidate may be set to be identical to a reference picture index of a first merge candidate or second merge candidate. In an example, when a reference picture index of a first merge candidate is identical with a second merge candidate, a reference picture index of an average merge candidate may be set to be identical to a reference picture index of the first merge candidate and the second merge candidate. When a reference picture index of a first merge candidate differs with a second merge candidate, priorities may be set on the basis of a value of a reference picture index of each merge candidate, a distance between a reference picture of each merge candidate with the current block, or whether or not bi-directional prediction is applied, and a reference picture index of a merge candidate with high (or low) priority may be set as a reference picture index of an average merge candidate. In an example, when bi-directional prediction is applied to a first merge candidate, and uni-directional prediction is applied to a second merge candidate, a reference picture index of the first merge candidate to which bi-directional prediction is applied may be determined as a reference picture index of an average merge candidate.

A merge candidate may be included in a merge candidate list according to predefined priority. A merge candidate with high priority may be assigned with a small index value. In an example, a spatial merge candidate may be added to a merge candidate list before than a temporal merge candidate. In addition, spatial merge candidates may be added to a merge candidate list in an order of a spatial merge candidate of a left neighboring block, a spatial merge candidate of a top neighboring block, a spatial merge candidate of a block adjacent to a top-right corner, a spatial merge candidate of a block adjacent to a bottom-left corner, and a spatial merge candidate of a block adjacent to a top-left corner. Alternatively, it may be set such that a spatial merge candidate derived from a neighboring block adjacent to a top-left corner of a current block (B2 of FIG. 10) is added to a merge candidate list later than a temporal merge candidate.

In another example, priorities between merge candidates may be determined according to a size or shape of a current block. In an example, when a current block has a rectangle shape where a width is greater than a height, a spatial merge candidate of a left neighboring block may be added to a merge candidate list before than a spatial merge candidate of a top neighboring block. On the other hand, when a current block has a rectangle shape where a height is greater than a width, a spatial merge candidate of a top neighboring block may be added to a merge candidate list before than a spatial merge candidate of a left neighboring block.

In another example, priorities between merge candidates may be determined according to motion information of respective merge candidates. In an example, a merge candidate having bi-directional motion information may have priority higher than a merge candidate having uni-directional motion information. Accordingly, a merge candidate having bi-directional motion information may be added to a merge candidate list before than a merge candidate having uni-directional motion information.

In another example, a merge candidate list may be generated according to predefined priority, and then merge candidates may be rearranged. Rearranging may be performed on the basis of motion information of merge candidates. In an example, rearranging may be performed on the basis of whether or not a merge candidate has bi-directional motion information, a size of a motion vector, precision of a motion vector, or a POC difference between a current picture and a reference picture of a merge candidate. In detail, a merge candidate having bi-directional motion information may be rearranged to have priority higher than a merge candidate having uni-directional motion information. Alternatively, a merge candidate having a motion vector with a precision value of a fractional-pel may be rearranged to have priority higher than a merge candidate having a motion vector with a precision of an integer-pel.

When the merge candidate list is generated, at least one of merge candidates included in the merge candidate list may be specified on the basis of a merge candidate index S940.

Motion information of the current block may be set to be identical to motion information of the merge candidate specified by the merge candidate index S950. In an example, when a spatial merge candidate is selected by the merge candidate index, motion information of the current block may be set to be identical to motion information of the spatial neighboring block. Alternatively, when a temporal merge candidate is selected by the merge candidate index, motion information of the current block may be set to be identical to motion information of the temporal neighboring block.

Figure 15:
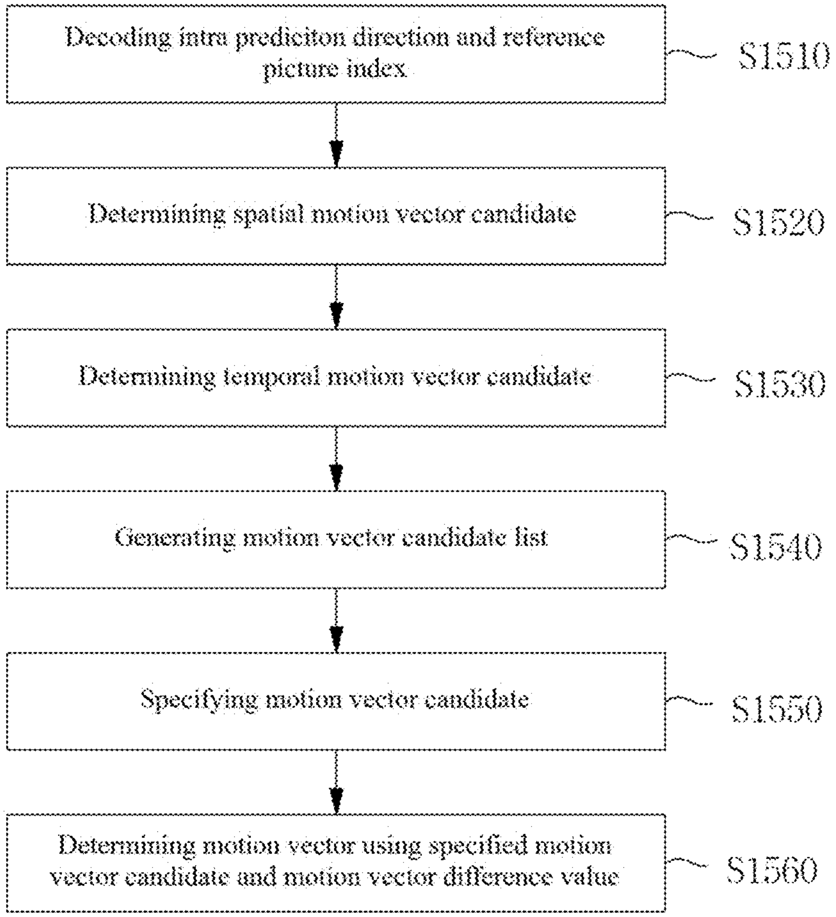
FIG. 15 is a diagram showing a process of deriving motion information of a current block when an AMVP mode is applied to the current block.

FIG. 15 is a diagram showing a process of deriving motion information of a current block when an AMVP mode is applied to the current block.

When an AMVP mode is applied to a current block, at least one of an inter-prediction direction of the current block, and a reference picture index may be decoded from a bitstream S1510. In other words, when an AMVP mode is applied, at least one of an inter-prediction direction of the current block, and a reference picture index may be determined on the basis of information encoded through a bitstream.

A spatial motion vector candidate may be determined on the basis of a motion vector of a spatial neighboring block of the current block. The spatial motion vector candidate may include at least one of a first spatial motion vector candidate derived from a top neighboring block of the current block, and a second spatial motion vector candidate derived from a left neighboring block of the current block. Herein, the top neighboring block may include at least one of blocks adjacent to a top and a top-right corner of the current block, and the left neighboring block of the current block includes at least one of blocks adjacent to a left and a left-bottom corner of the current block. The block adjacent to the left-top corner of the current block may be used as the top neighboring block or may be used as the left neighboring block.

Alternatively, a spatial motion vector candidate may be derived from a spatial non-neighboring block that is not adjacent to a current block. In an example, a spatial motion vector candidate of a current block may be derived by using at least one of: a block positioned at the same vertical line with a block adjacent to a top, top-right corner, or top-left corner of the current block; a block positioned at the same horizontal line with a block adjacent to a left, bottom-left corner, or top-left corner of the current block; and a block positioned at the same diagonal line with a block adjacent to a corner of the current block. When a spatial neighboring block is not available, a spatial motion vector candidate may be derived by using a spatial non-neighboring block.

In another example, at least two spatial motion vector candidates may be derived by using a spatial neighboring block and spatial non-neighboring blocks. In an example, a first spatial motion vector candidate and a second spatial motion vector candidate may be derived by using neighboring blocks adjacent to a current block. Meanwhile, a third spatial motion vector candidate and/or a fourth spatial motion vector candidate may be derived on the basis of blocks that are not adjacent to the current block but adjacent to the above neighboring blocks.

When the current block differs in a reference picture with the spatial neighboring block, a spatial motion vector may be obtained by performing scaling for a motion vector of the spatial neighboring block. A temporal motion vector candidate may be determined on the basis of a motion vector of the temporal neighboring block of the current block S1530. When the current block differs in a reference picture with the temporal neighboring block, a temporal motion vector may be obtained by performing scaling on a motion vector of the temporal neighboring block. Herein, when the number of spatial motion vector candidates is equal to or smaller than a predetermined number, a temporal motion vector candidate may be derived.

A motion vector candidate list including the spatial motion vector candidate and the temporal motion vector candidate may be generated S1540.

When the motion vector candidate list is generated, at least one of motion vector candidates included in the motion vector candidate list may be specified on the basis of information specifying at least one of the motion vector candidate list S1550.

The motion vector candidate specified by the information may be set as a prediction value of a motion vector of the current block, and the motion vector of the current block may be obtained by adding a residual value of a motion vector to the prediction value of the motion vector S1560. Herein, the residual value of the motion vector may be parsed through a bitstream.

When the motion information of the current block is obtained, motion compensation for the current block may be performed on the basis of the obtained motion information S820. In detail, motion compensation for the current block may be performed on the basis of an inter-prediction direction, a reference picture index, and a motion vector of the current block.

When a prediction sample is obtained by performing motion compensation, the current block may be reconstructed on the basis of the generated prediction sample. In detail, a reconstructed sample may be obtained by adding a prediction sample of a current block and a residual sample.

A merge candidate may be derived on the basis of a block having a predetermined shape or a block having a predetermined size or greater. Accordingly, when a current block does not have a predetermined shape or when a size of a current block is smaller than a predetermined size, a merge candidate of the current block may be derived on the basis of a block having a predetermined shape or having a predetermined size or greater and which includes the current block. In an example, a merge candidate of a coding unit having a non-square shape may be derived on the basis of a coding unit having a square shape and which includes the coding unit having the non-square shape.

Figure 16:
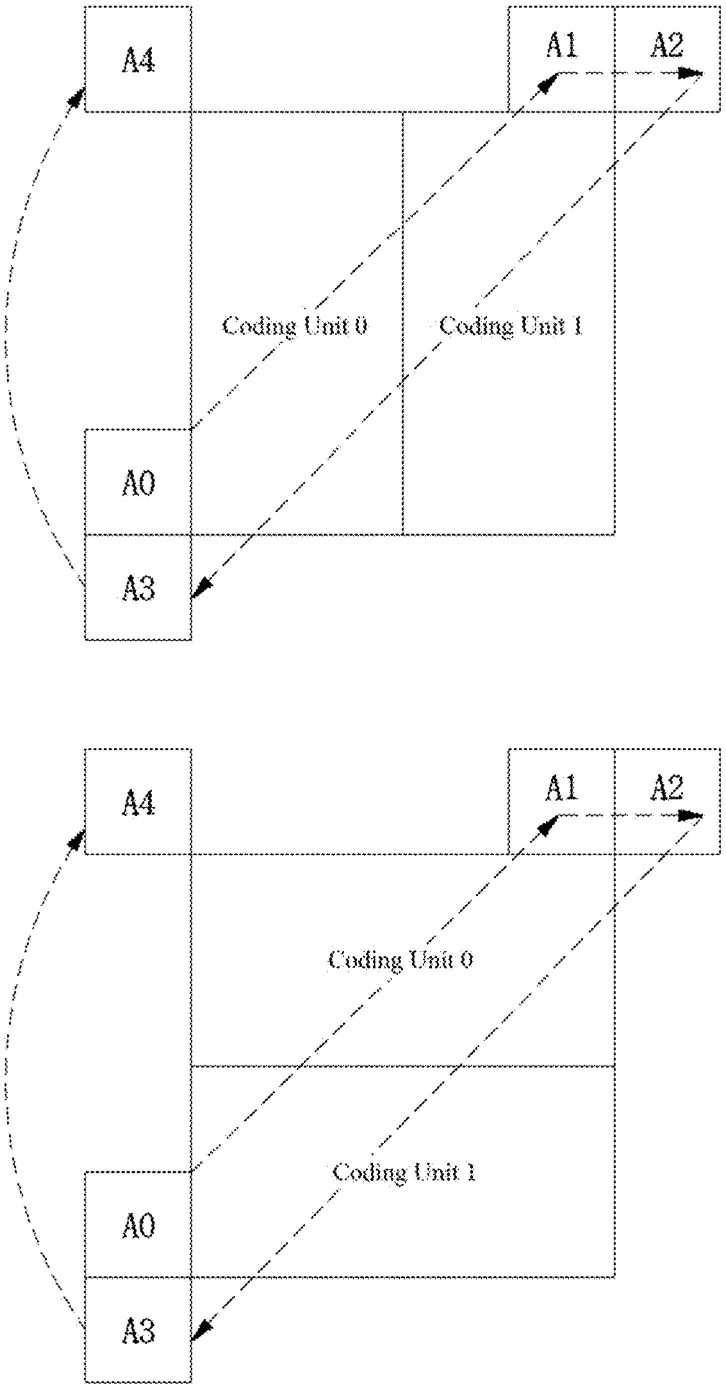
FIG. 16 is a diagram showing an example of deriving a merge candidate of a non-square block on the basis of a square block.

FIG. 16 is a diagram showing an example of deriving a merge candidate of a non-square block on the basis of a square block.

A merge candidate of a non-square block may be derived on the basis of a square block including the non-square block. In an example, in an example of FIG. 16, a merge candidate of a coding block 0 and a coding block 1 which have a non-square shape may be derived on the basis of a block having a square shape. Accordingly, a merge candidate of the coding block 0 and the coding block 1 may be derived from at least one of spatial neighboring blocks A0, A1, A2, A3, and A4 which are adjacent to a block having a square shape.

Although it is not shown, a temporal merge candidate of a non-square block may be also derived on the basis of a block having a square shape. In an example, a coding block 0 and a coding block 1 may use a temporal merge candidate derived from a temporal neighboring block determined on the basis of a block having a square shape. Accordingly, the coding block 0 and the coding block 1 belonging to a square block may share the same merge candidate.

Alternatively, at least one of a spatial merge candidate and a temporal merge candidate may be derived on the basis of a square block, and the other one may be derived on the basis of a non-square block. In an example, a coding block 0 and a coding block 1 may use the same spatial merge candidate derived on the basis of a square block. Alternatively, a coding block 0 and a coding block 1 may use temporal merge candidates different from each other according to a position of each block.

In the above-described example, an example is shown where a merge candidate is derived on the basis of a square block, but a merge candidate is possibly derived on the basis of a non-square block having a predetermined shape. In an example, when a current block is a non-square block having a 2N×n shape (herein, n is ½N), a merge candidate of a current block may be derived on the basis of a non-square block having a 2N×N shape, and when a current block is a non-square block having an n×2N shape, a merge candidate of the current block may be derived on the basis of a non-square block having an N×2N shape.

Information representing a block shape or a block size which becomes a reference for deriving a merge candidate may be signaled from a bitstream. In an example, information on a block shape which represents whether the shape is a non-square or square may be signaled from a bitstream. Alternatively, a merge candidate may be derived on the basis of a block having a predefined shape or predefined size or greater according to a rule predefined in the encoder/decoder.

In another example, a merge candidate may be derived on the basis of a parent node satisfying a predetermined condition. Herein, the predetermined condition may include whether or not being a unit of quad-tree partitioning, a block size, a block shape, or whether or not exceeding a picture boundary. Herein, the unit of quad-tree partitioning may represent a block generated by applying quad-tree partitioning or a block to which quad-tree partitioning is possibly applied (for example, a square block having a predetermined size or greater). In an example, when it is set to derive a merge candidate in a unit of quad-tree partitioning, a merge candidate of a current block may be derived on the basis of a parent node that is a unit of quad-tree partitioning when the current block is generated by binary-tree partitioning or ternary-tree partitioning. When a parent node block that is a unit of quad-tree partitioning for a current block is not present, a merge candidate of the current block may be derived on the basis of a LCU or block having a predetermined size which includes the current block.

Figure 17:
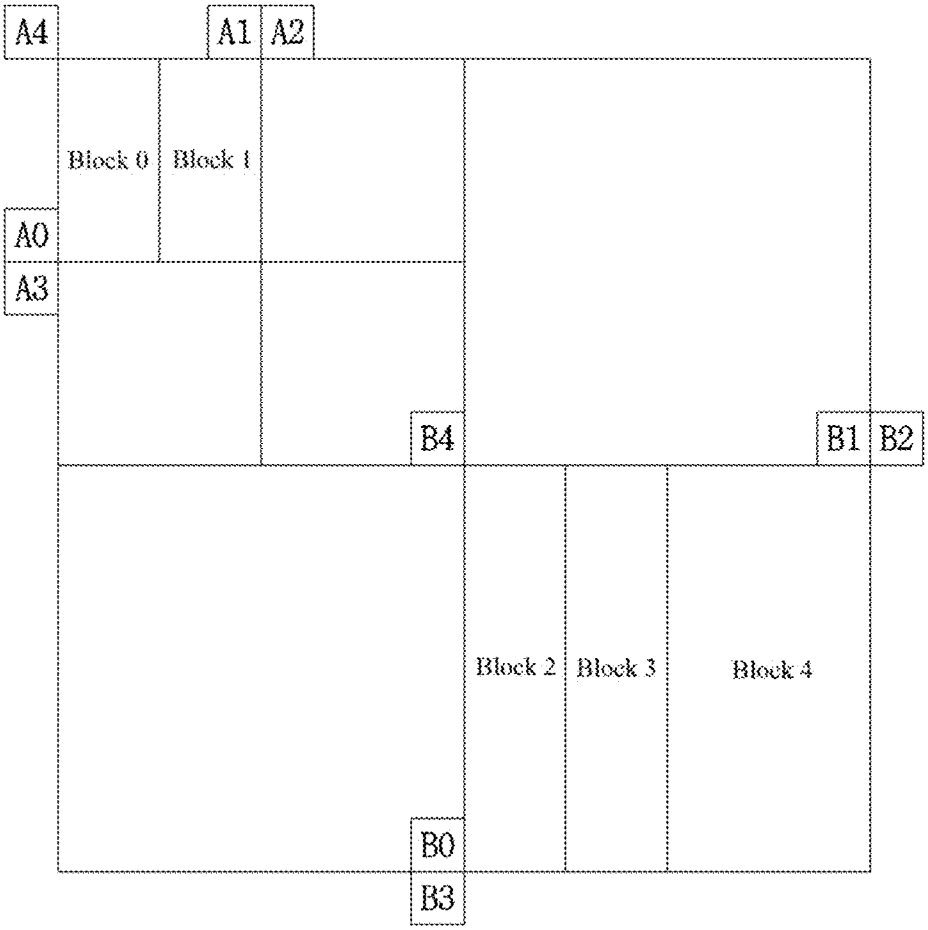
FIG. 17 is a diagram showing an example where a merge candidate of a block obtained from binary-tree partitioning is derived on the basis of a parent node block.

FIG. 17 is a diagram showing an example where a merge candidate of a block obtained from binary-tree partitioning is derived on the basis of a parent node block.

A block 0 and a block 1 having a non-square shape and which are obtained on the basis of a binary-tree shape may use at least one of spatial merge candidates A0, A1, A2, A3, and A4 which are derived on the basis of a parent node of a quad-tree unit. Accordingly, the block 0 and the block 1 may use the same spatial merge candidate.

In addition, a block 2, a block 3, and a block 4 having a non-square shape and which are obtained on the basis of binary-tree partitioning may use at least one of spatial merge candidates B0, B1, B2, B3, and B4 which are derived on the basis of a parent node of a quad-tree unit. Accordingly, the block 2, the block 3, and the block 4 may use the same spatial merge candidate.

Although it is not shown, a temporal merge candidate of a block obtained from binary-tree partitioning may be also derived on the basis of a parent node block. Accordingly, the block 0 and the block 1 may use the same temporal merge candidate derived from a temporal neighboring block determined on the basis of a quad-tree block unit. In addition, the block 2, the block 3, and the block 4 may also use the same temporal merge candidate derived from a temporal neighboring block determined on the basis of a quad-tree block unit. Accordingly, child node blocks included in a parent node block may share the same merge candidate list.

In addition, at least one of a spatial merge candidate and a temporal merge candidate may be derived on the basis of a child node block, and the other one may be derived on the basis of a parent node block. In an example, a block 0 and a block 1 may use the same spatial merge candidate derived on the basis of a parent node block. Alternatively, a block 0 and a block 1 may use temporal merge candidates different from each other according to a position of each block.

In another example, when quad-tree partitioning, binary-tree partitioning or ternary-tree partitioning is applied to a coding block, among child node blocks, a block having a preset size or smaller or a non-square block may be included. When the parent node block does not exceed a picture boundary, a merge candidate may be derived on the basis of a parent node block having a square or non-square shape where a width or height is equal to or greater than a predefined value, or the number of samples is 64, 128, or 256. Child node blocks included in a parent node block may share the same merge candidate list derived on the basis of the parent node block.

Alternatively, it may be set such that a merge candidate may be derived on the basis of any one of child node blocks included in a parent node block, and the derived merge candidate list may be shared on the basis of any one of child node blocks included in a child node block.

Information representing whether or not child node blocks share a merge candidate list derived on the basis of a parent node block may be signaled through a bitstream. According to the above information, whether or not a merge candidate of a block having a predefined size of smaller or a non-square block is derived on the basis of a parent node block may be determined. Alternatively, whether or not to derive a merge candidate on the basis of a parent node block may be determined according to a rule predefined in the encoder/decoder.

As described above, a merge candidate of a current block may be derived on the basis of a block unit (for example, coding block or prediction block) or predefined unit. Herein, a spatial merge candidate of a current block which is present within a predefined region may be excluded from a spatial merge candidate by determining that the same is not usable. In an example, when a parallel processing region is defined for parallel processing between blocks, it may be determined that a spatial merge candidate of a current block which is included in the parallel processing region is not usable. A parallel processing region may be referred to as a merge estimation region (MER). A merge scheme for blocks within a parallel processing region may be performed in parallel. In order to determine whether or not a current block and a spatial neighboring block are included in the same merge estimation region, shift calculation may be performed. In detail, shift calculation of a position of a left reference sample of a current block and a position of a spatial neighboring block may be used.

A merge estimation region may have a square shape or a non-square shape. For example, a prediction unit or coding unit which has a square or non-square shape may be defined as a merge estimation region. A merge estimation region having a non-square shape may be limited to have a predetermined shape. In an example, a merge estimation region having a non-square shape may have a 2N×N or N×2N shape.

At least one of information representing a shape of a merge estimation region and information representing a size of a merge estimation region may be signaled through a bitstream. In an example, information on a shape or size of a merge estimation region may be signaled through a slice header, a picture parameter or a sequence parameter. Alternatively, at least one of a shape and a size of a merge estimation region within a sequence or picture may vary. For example, a size or shape of a merge estimation region may be updated on the basis of a slice or picture. When a size or shape of a merge estimation region differs with a previous region unit, information on an updated merge estimation region may be signaled.

The minimum value or the maximum value of a block included in a merge estimation region may be defined. In an example, when the number of blocks included in a merge estimation region is smaller than the maximum value, when the number of blocks included in a merge estimation region is greater than the minimum value, or when the number of blocks included in a merge estimation region is in a range of the minimum value or the maximum value, parallel processing may be allowed for blocks included in a merge estimation region.

Information representing a shape of a merge estimation region may be a 1-bit flag. In an example, a syntax of "isrectagular_mer_flag" representing whether a merge estimation region is a square or non-square may be signaled through a bitstream. When a value of isrectagular_mer_flag is 1, it may represent that a merge estimation region is a non-square, and when a value of isrectagular_mer_flag is 0, it may represent that a merge estimation region is a square.

When a merge estimation region is a non-square, at least one piece of information on at least one of a width, a height, and a ratio between the width and the height may be singled through a bitstream. On the basis of the above, a size and/or a shape a merge estimation region having a non-square shape may be derived.

Figure 18:
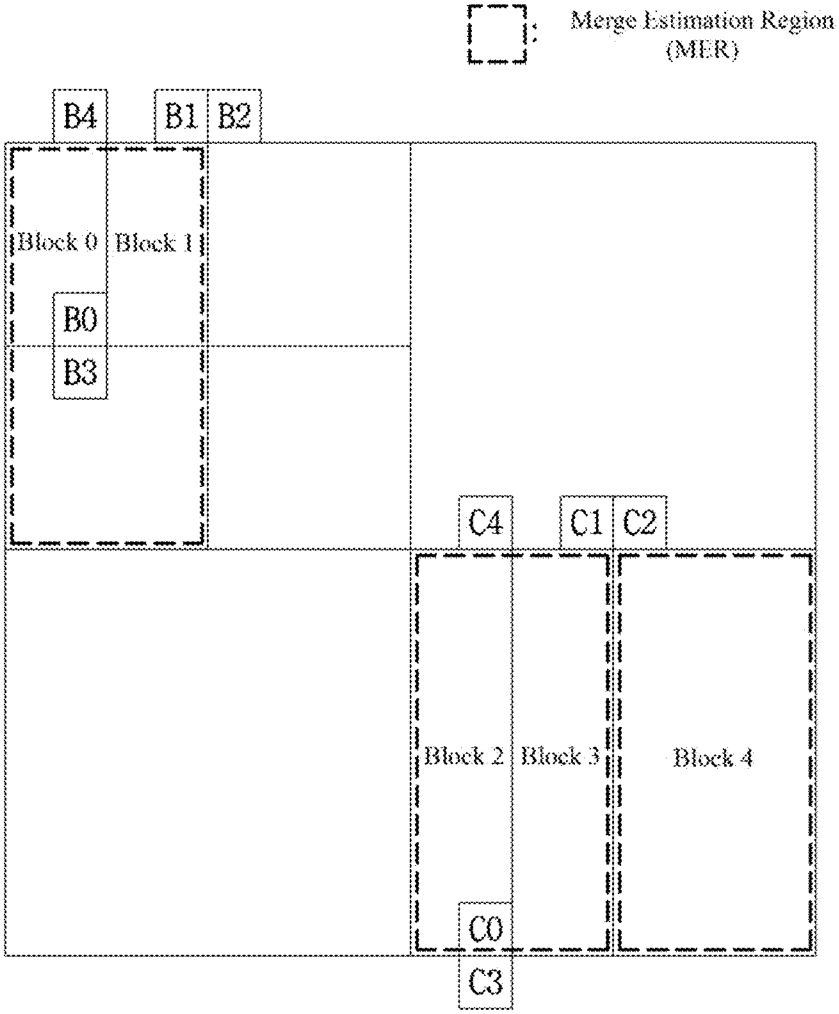
FIG. 18 is a diagram showing an example of determining availability of a spatial neighboring block according to a merge estimation region.

FIG. 18 is a diagram showing an example of determining availability of a spatial neighboring block according to a merge estimation region.

When a merge estimation region has an N×2N shape, and the merge estimation region has a predetermine size, spatial neighboring blocks B0 and B3 which are included in the same merge estimation region with a block 1 included in the merge estimation region are not used as a spatial merge candidate of the block 1. Accordingly, a spatial merge candidate of the block 1 may be derived from at least one of spatial neighboring blocks B1, B2, and B4 excluding the spatial neighboring blocks B0 and B3.

Similarly, a spatial neighboring block C0 included in the same merge estimation region with a block 3 is not usable as a spatial merge candidate of the block 3. Accordingly, a spatial merge candidate of the block 3 may be derived from at least one of spatial neighboring blocks C1, C2, C3, and C4 excluding the spatial neighboring block C0.

Deriving a merge candidate between blocks may be performed in an order according to priorities between blocks or according to a predefined order. Herein, priorities or predefined order may be determined on the basis of an encoding/decoding order between blocks, a block scan order, a raster scan order, a size/shape of a block, a block position, a relative position between blocks, a partition index, or whether or not being included in the same merge estimation region. In an example, when a square block is partitioned into a plurality of blocks having a non-square shape, motion compensation may be performed on the plurality of blocks having a non-square shape according to an encoding/decoding order. Accordingly, a merge candidate of the plurality of blocks having a non-square shape may be sequentially derived according to an encoding/decoding order.

When configuring a merge candidate list of a current block, motion information on a neighboring block or a merge candidate of a neighboring block may be used. In an example, when a merge candidate of a current block is derived on the basis of a parent node block including the current block, it may be set such that a merge candidate having motion information identical with a neighboring block or a merge candidate indicated by a merge index of a neighboring block is not usable as a merge candidate of the current block.

Figure 19A:
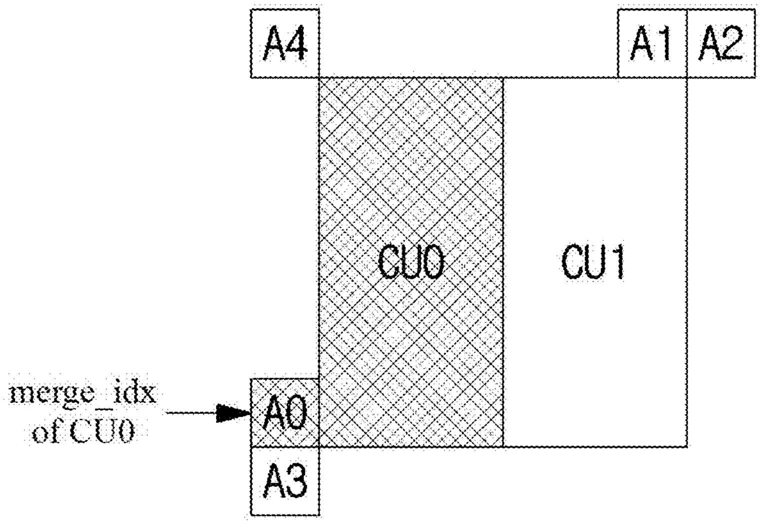
FIGS. 19A and 19B are diagrams showing an example of deriving a merge candidate of a current block by using a merge index of a neighboring block.
Figure 19B:
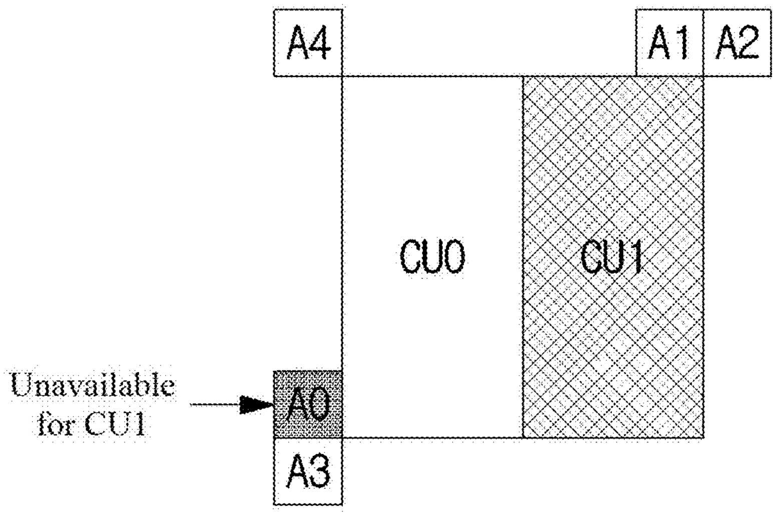

FIGS. 19A and 19B are diagrams showing an example of deriving a merge candidate of a current block by using a merge index of a neighboring block.

For convenience of description, among non-square blocks shown in FIGS. 19A and 19B, a block having a fast encoding/decoding order is defined as a first block, and a block having a late encoding/decoding order is defined as a second block. In addition, the first block is a non-square block positioned at a left, and the second block is a non-square block positioned at a right. In addition, it is assumed that a merge candidate of the first block and the second block is derived on the basis of a parent node block having a square shape.

First, a merge candidate of the first block may be derived on the basis of a parent node block. In an example, as an example shown in FIGS. 19A and 19B, a merge candidate of the first block may be derived from spatial neighboring blocks A0, A1, A2, A3, and A4 which are adjacent to the parent node block.

Motion information of the first block may be derived on the basis of a merge candidate specified by a merge index. In an example, when a merge index of the first block indicates a merge candidate derived from a merge index of A0, motion information of the first block may be set to be identical with A0.

Subsequently, a merge candidate of the second block may be derived on the basis of the parent node block. Herein, it may be determined that the merge candidate specified by the merge index of the first block is not usable as a merge candidate of the second block. In an example, a spatial neighboring block A0 adjacent to the parent node block is specified by the merge index of the first block, and thus it may be determined that the block is not usable as a merge candidate of the second block. Accordingly, a merge candidate of the second block may be derived from spatial neighboring blocks A1, A2, A3, and A4 which are adjacent to the parent node block.

Alternatively, among merge candidates of the second block, it may be determined that a merge candidate having motion information identical with the first block is not usable as a merge candidate of the second block. In an example, among spatial neighboring blocks A0, A1, A2, A3, and A4 which are adjacent to the parent node block, motion information of A0 is identical to motion information of the first block, and thus it may be determined that A0 is not usable as a merge candidate of the second block.

In addition to the example shown in the figure, when deriving a merge candidate by using a spatial non-neighboring block, it may be determined that a spatial non-neighboring block selected for a previously encoded/decoded block is not usable as a merge candidate of a current block.

When the first block is not encoded through a merge mode, it may be set such that a merge candidate having motion information identical with the first block is not usable as a merge candidate of the second block.

Although the above-described examples have been described based on a decoding process, an encoding process may be performed in the same order as described above or in the reverse order thereof.

Although the above-described embodiments have been described on the basis of a series of steps or flowcharts, they are not intended to limit the inventive time-series order, and may be performed simultaneously or in a different order. In addition, each of the components (for example, units, modules, etc.) constituting the block diagram in the above-described embodiment may be implemented as a hardware device or software, and a plurality of components may be combined into one hardware device or software. The above-described embodiments may be implemented in the form of program instructions that may be executed through various computer components and recorded in a computer-readable recording medium. The computer-readable storage medium may include a program instruction, a data file, a data structure, and the like either alone or in combination thereof. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. The hardware devices may be configured to be operated by one or more software modules or vice versa to conduct the processes according to the present invention.

INDUSTRIAL APPLICABILITY

The present invention may be applied to an electronic device capable of encoding/decoding an image.

The invention claimed is:

1. A method of decoding a video, the method comprising:

determining whether a merge mode is applied to a coding block or not;

in response to the merge mode being applied to the coding block, deriving spatial merge candidates from spatial neighboring blocks, the spatial neighboring blocks being determined based on a position and a size of the coding block;

constructing a merge candidate list of the coding block;

obtaining motion information based on a merge index of the coding block; and performing motion compensation based on the motion information, wherein if a number of merge candidates included in the merge candidate list is less than a first threshold value, an average merge candidate, generated based on two of the merge candidates, is newly inserted to the merge candidate list, the merge candidates including the spatial merge candidates and a temporal merge candidate, wherein when a first merge candidate, among the two of the merge candidates, has both L0 (List 0) and L1 (List 1) motion information while a second merge candidate, among the two of the merge candidates, has only L0 motion information, an L0 motion vector of the average merge candidate is derived by averaging an L0 motion vector of the first merge candidate and an L0 motion vector of the second merge candidate and an L1 motion vector of the average merge candidate is derived to be the same as an L1 motion vector of the first merge candidate, and wherein an L0 reference picture index of the average merge candidate is inherited from one of the first merge candidate and the second merge candidate that has an index value less than the other of the first merge candidate and the second merge candidate.

2. The method of claim 1, wherein when an index value of the first merge candidate is less than an index value of the second merge candidate, the L0 reference picture index of the average merge candidate is set to be identical to an L0 reference picture index of the first merge candidate, and wherein when the index value of the first merge candidate is greater than the index value of the second merge candidate, the L0 reference picture index of the average merge candidate is set to be identical to an L0 reference picture index of the second merge candidate.

3. A method of encoding a video, the method comprising:

in response to a merge mode being applied to a coding block, deriving spatial merge candidates from spatial neighboring blocks, the spatial neighboring blocks being determined based on a position and a size of the coding block;

constructing a merge candidate list of the coding block;

obtaining motion information based on a index of the coding block; and performing motion compensation based on the motion information, wherein if a number of merge candidates included in the merge candidate list is less than a first threshold value, an average merge candidate, generated based on two of the merge candidates, is newly inserted to the merge candidate list, the merge candidates including the spatial merge candidates and a temporal merge candidate, wherein when a first merge candidate, among the two of the merge candidates, has both L0 (List 0) and L1 (List 1) motion information while a second merge candidate, among the two of the merge candidates, has only L0 motion information, an L0 motion vector of the average merge candidate is derived by averaging an L0 motion vector of the first merge candidate and an L0 motion vector of the second merge candidate and an L1 motion vector of the average merge candidate is derived to be the same as an L1 motion vector of the first merge candidate, and wherein an L0 reference picture index of the average merge candidate is inherited from one of the first merge candidate and the second merge candidate that has an index value less than the other of the first merge candidate and the second merge candidate.

4. A device for transmitting compressed data associated with a video signal, comprising:

a processor configured to obtain the compressed data; and a transmitting unit configured to transmit the compressed data, wherein obtaining the compressed data comprises:

in response to a merge mode being applied to a coding block, deriving spatial merge candidates from spatial neighboring blocks, the spatial neighboring blocks being determined based on a position and a size of the coding block;

constructing a merge candidate list of the coding block;

obtaining motion information based on a index of the coding block; and performing motion compensation based on the motion information, wherein if a number of merge candidates included in the merge candidate list is less than a first threshold value, an average merge candidate, generated based on two of the merge candidates, is newly inserted to the merge candidate list, the merge candidates including the spatial merge candidates and a temporal merge candidates, wherein when a first merge candidate, among the two of the merge candidates, has both L0 (List 0) and L1 (List 1) motion information while a second merge candidate, among the two of the merge candidates, has only L0 motion information, an L0 motion vector of the average merge candidate is derived by averaging an L0 motion vector of the first merge candidate and an L0 motion vector of the second merge candidate and an L1 motion vector of the average merge candidate is derived to be the same as an L1 motion vector of the first merge candidate, and wherein an L0 reference picture index of the average merge candidate is inherited from one of the first merge candidate and the second merge candidate that has an index value less than the other of the first merge candidate and the second merge candidate.

* * * * *